US007527557B2

(12) United States Patent
Jackson

(10) Patent No.: US 7,527,557 B2
(45) Date of Patent: May 5, 2009

(54) MULTIPLE PLAY REEL SLOT SYSTEM

(75) Inventor: Kathleen Nylund Jackson, Scituate, MA (US)

(73) Assignee: Precedent Gaming, Inc., Scituate, MA (US)

( * ) Notice: Subject to any disclaimer, the term of this patent is extended or adjusted under 35 U.S.C. 154(b) by 1010 days.

(21) Appl. No.: 10/615,348

(22) Filed: Jul. 8, 2003

(65) Prior Publication Data

US 2004/0166924 A1 Aug. 26, 2004

(51) Int. Cl.
*A63F 13/00* (2006.01)

(52) U.S. Cl. .......................................................... 463/20

(58) Field of Classification Search ............. 463/16–22, 463/25–28

See application file for complete search history.

(56) References Cited

U.S. PATENT DOCUMENTS

| | | | | |
|---|---|---|---|---|
| 5,976,016 | A | 11/1999 | Moody et al. | 463/13 |
| 6,098,985 | A | 8/2000 | Moody | 273/292 |
| 6,120,378 | A | 9/2000 | Moody et al. | 463/20 |
| 6,311,978 | B1 | 11/2001 | Moody | 273/292 |
| 2004/0053673 | A1* | 3/2004 | Mishra | 463/20 |
| 2004/0166924 | A1* | 8/2004 | Jackson | 463/20 |
| 2004/0242306 | A1* | 12/2004 | Tarantino | 463/16 |
| 2005/0014555 | A1* | 1/2005 | Seelig et al. | 463/20 |
| 2006/0223629 | A1* | 10/2006 | Walker et al. | 463/25 |
| 2006/0247030 | A1* | 11/2006 | Walker et al. | 463/25 |
| 2006/0252482 | A1* | 11/2006 | Walker et al. | 463/13 |

* cited by examiner

*Primary Examiner*—Ronald Laneau
(74) *Attorney, Agent, or Firm*—Mark A. Litman & Associates, P.A.

(57) ABSTRACT

A method of playing a wagering game comprises a player placing a wager in a gaming machine. The machine has more than one symbol display system comprising a first symbol display area and at least a second symbol display area. The first display area and at least second display area displaying a plurality of symbols that are used to determine winning events. The first display area providing at least one first symbol. The first symbol is automatically provided to the at least second display area. The machine then independently completes symbol display for the first display area and the at least second display area and then determines if winning events are present in the first display area and the at least second display area. In addition, the wagering game may include an interactive bonus feature, whereby the player may specify a special symbol and play a bonus event if a plurality of those specified symbols appears on the payline of any wagered game.

20 Claims, 30 Drawing Sheets

The paytable is standard, with pays ranging from one red cherry dollar to 3 gold coins. This sample paytable is based on a wager of 5 coins per game.

5-Play Penny Candy(A)

The player has bet 5 games and has bet 30 credits per game (pressing “Bet 10 Per Game” three times.)

The player presses DEAL and the main reels spin.

5-Play Penny Candy(B)

As soon as the first reel stops, the same result is automatically, instantaneously shown on the first reel in each game.

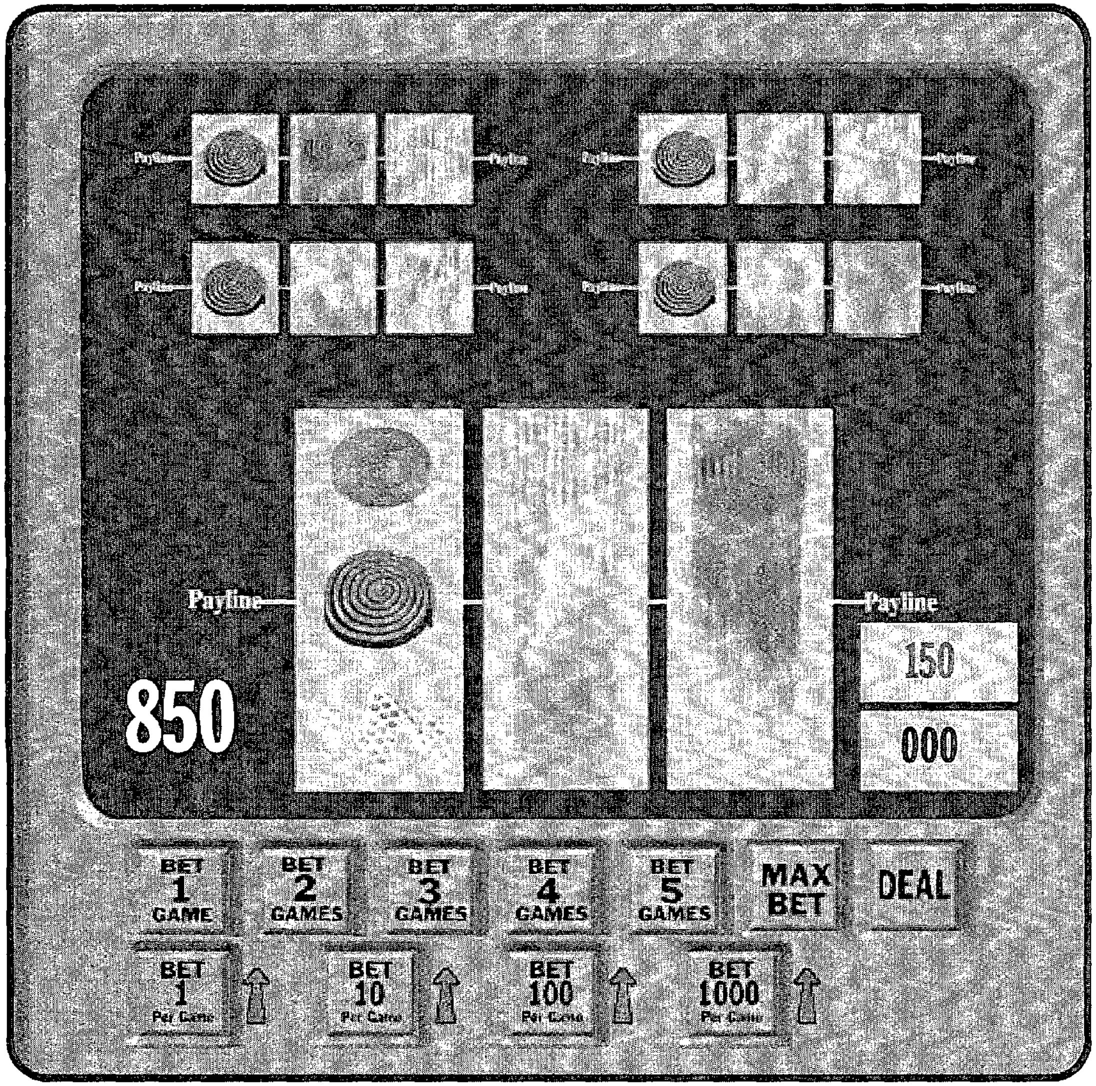

FIG. 5

5-Play Penny Candy(c)

The random number generator would then take all the combinations that start with that symbol, in this case the licorice record, and use that group from which to pick the final five combinations. (If the first reel has landed on a BLANK, that would be the first reel on all the games, and the final combinations would be picked from that group of combinations that start with a BLANK.)

Immediately reels 2 and 3 in the rest of the games (four in this example) also begin to spin.

5-Play Penny Candy(D)

All the second reels stop spinning.

5-Play Penny Candy(E)

Finally all the third reels stop spinning.

The player wins 30 for the mixed candy in game 5. The player also wins 600 for the 3 licorice records in game 2.

*To keep the player's hopes up in the case of spinning a BLANK on the first reel, the cherry dollar would become a CHERRY-like pay.*

Alternate Play Pattern(A)

Just as in the original version, the first reel result is duplicated in all hands.
In this version, however, each game is brought to conclusion before the next game is played out.
Here the main reel has been completed.

Alternate Play Pattern(B)

Now the second game reels have stopped, and the result known.

Alternate Play Pattern(c)

The third game reels have stopped, and the result known.

Alternate Play Pattern(D)

The fourth game reels have stopped, and the result known.

Alternate Play Pattern(E)

The fifth and final game reels have stopped.

Alternate Play Pattern(F)

All the results are paid according to the paytable.

A 3-REEL MULTIPLAY SLOT GAME

IT'S YOUR LUCKY DAY is a 3-reel casino slot game that is designed specifically for multiplay. The theme and gameplay are enhanced by the ability to play from 1 to 100 games at a time! It can be played in a multi-denominational format, with the payouts based on standard 3-reel pay schedules.

The novelty of IT'S YOUR LUCKY DAY lets the player interact with the game, increasing the thrill and anticipation of winning big. Playing on superstition and lucky dates, the game personalizes the gaming experience by allowing the player to pick her own favorite month for each spin. If a win of the correct month comes up, the game automatically goes into bonus mode, and picking the correct day out of 31 will multiply the already hefty payout!

FIG. 14

The basic paytable is relatively standard, with pays ranging from one red DOLLAR SIGN (similar to cherry pay) to 3 IDENTICAL MONTHS specifically chosen by the player. All months are represented by birthstones as well as the name of the month.This sample paytable is based on a wager of 5 coins per game.

5-Play Lucky Day (A)

The player bets the number of games to be played (5) and the number of credits bet per game.

THEN THE PLAYER PICKS A SPECIAL MONTH BY TOUCHING THE ICON ON THE SCREEN. HERE THE PLAYER PICKS "AUGUST" (If no month is picked, one of the 12 months will be randomly picked upon spinning.)

5-Play Lucky Day(B)

The player presses SPIN.

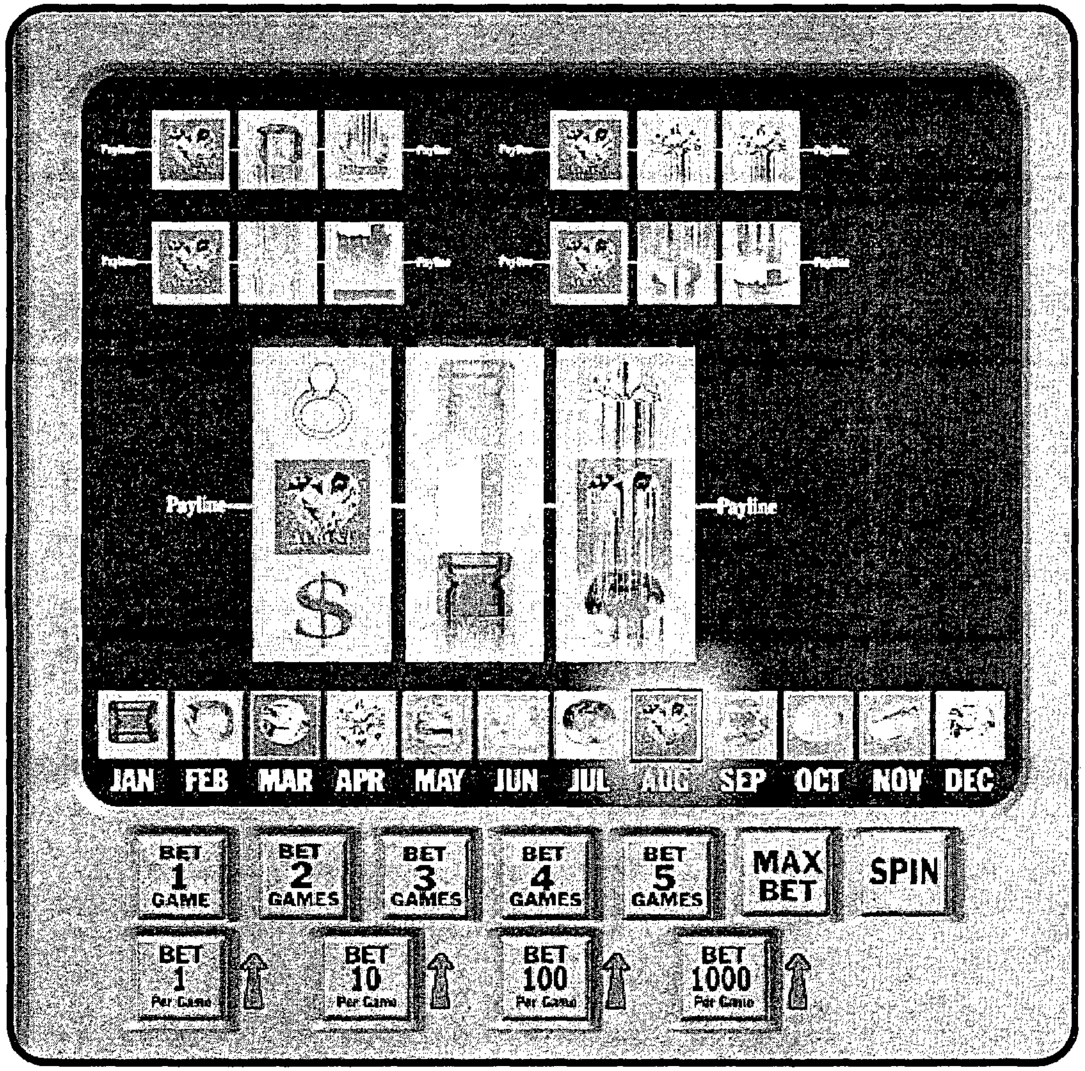

FIG. 20

5-Play Lucky Day(D)

As soon as the first reel of the main game stops, the symbol on the payline is instantly stopped as the first reel payline symbol IN EACH GAME. All games will be played out independently of each other.
All the second and third reels continue to spin.
(If the first main reel payline symbol is a BLANK, then a blank would appear on the first reel of every other game.)

HERE THERE IS GREAT SUSPENSE FOR THE PLAYER! THE FIRST REEL SYMBOL IN EVERY GAME IS "AUGUST"!

5-Play Lucky Day(F)

The third reel of the main game stops.
The player has won for MIXED MONTHS in this first game.

5-Play Lucky Day(G)

Immediately the second game is completed. Here the player wins a cherry-like pay for the red DOLLAR SIGN.

5-Play Lucky Day(H)

The third game is then completed, YIELDING NO WIN.

5-Play Lucky Day(I)

The fourth game is completed, and the player gets 3 OF HER FAVORITE MONTH "AUGUST"!!!!!!!

This win pays 5 times the amount of other matched months. and as soon as all of the games are complete, the player will get a BONUS ROUND GAME!!!!

5-Play Lucky Day (J)

The final game is now complete, and the player wins for CONSECUTIVE MONTHS (August, September, October).

All payouts are shown.

5-Play Lucky Day(K)

IMMEDIATELY A 31-DAY BONUS CALENDAR APPEARS (since the player got 3 of her special month).

5-Play Lucky Day(L)

The player is prompted to pick her lucky day by touching one of the dates.

Here she picks "4".

(NOTE: To keep the chances even, all months would have 31 days to pick from. A player could pick her actual favorite date, or just pick a wacky February 30th, for instance!)

MULTIPLE PLAY REEL SLOT SYSTEM

BACKGROUND OF THE INVENTION

1. Field of the Invention

The present invention relates to the field of video wagering games, particularly slot-type machines, and particularly physical reel or virtual reel slot type wagering machines that are capable of playing a number of games at the same time.

2. Background of the Art

Competition in the gaming industry to attract a player and then retain the player's interest for protracted periods of time is an increasingly greater challenge. The environment in a casino is typically rich in stimulation, both visual and auditory. As a consequence, it is an ongoing effort to initially attract a player to a given machine and then to subsequently encourage the player to stay at the machine based on the machine's entertainment value.

Slot machines formed from a plurality of reels which rotate independently of each other, whether mechanical or video depictions of the mechanical reels, are some of the oldest types of games. Each physical reel has a reel strip. On each reel strip are designated indicia. When predetermined indicia, and especially related indicia are oriented on a "pay line" that corresponds to the symbols or predetermined sets of symbols an associated pay table displayed elsewhere on the machines, the player receive awards.

Such machines have evolved from having a single horizontal pay line centrally disposed on the reel to having a plurality of pay lines, some pay lines located horizontally, some diagonally, others vertically, some in corners, and some in non-linear patterns. The most common pay lines have been provided as a) three symbols in a linear pattern taken from sets of frames on reels having 3 columns and 3 rows, or b) five symbols in a row taken from a set of three rows and five columns.

It is desirable to have players play as many games as rapidly as possible to increase cash flow through the wagering equipment. Among the more successful methods for stimulating greater levels of play in gaming apparatus has been the multi-line slot machine or multi-game poker machines such as those described in U.S. Pat. Nos. 5,976,016; 6,098,985; 6,120,378; and 6,311,978. Typical of play in these games is the game shown in U.S. Pat. No. 5,976,016 wherein a player makes a wager for each pay line on a slot machine that the player wishes to play. On a first pay line of the slot machine, a first row of symbols is displayed to the player. The player selects none, one or more of the symbols from the first pay line as symbols to be held. The symbols that are held are duplicated from the first pay line into all of the other pay lines on which the player has wagered. Replacement symbols for the non-selected symbols are then randomly displayed on the first pay line for the symbols that were discarded. Additional symbols are also randomly displayed into all of the other pay lines wagered on by the player so that each pay line has the required number of symbols. The ranking of each pay line is determined by comparing the results of the displayed symbols to a pay table. The player is then paid for any winning pay lines based on the pay table and the amount of the player's wager. The use of this underlying method is used in reel-slot-type video games, video poker, video 21 and video keno. These games have been very successful in the market.

There is always a desire to develop new games with different programs and displays that provide alternative entertainment and maintain player enjoyment with increased numbers of wagers. These multiple games are particularly desirable with the use of low minimum wagering systems such as penny, nickel and quarter machines, although they may be used with wagering apparatus having larger minimum wagers.

Additional player stimulation could be achieved by an interactive bonus feature, which could personalize the game for the player, and increase time on the machine and entertainment value.

SUMMARY OF THE INVENTION

In the present invention, a base game is played, and satellite games are provided. The player wagers at least a minimum amount on a base game and optionally places additional at least minimum wagers on one or more of the satellite games. The symbol display systems on the base game and the satellite game spin at the same time. Any other format of displaying symbols that can be read in an ordered array, such as in circles, in radial alignment, rectangular frame arrays (e.g., in a linear pattern of four lines of frames forming a rectangle), or another readable format of symbol displays that are reproduceable in multiple arrays with at least one frame in the order of a first array (preferably a first frame in the order) being reproduceable in the virtual replications of the first array. The symbols are usually displayed in rows, such as in typical reel or video reel-type slot machines. One specific symbol is stopped first on the base game (either alone or in combination with the other symbols needed to complete a payline on the base game), and that one specific symbol is also displayed in each of the satellite games, or at least those satellite games where wagers have been placed. Non-wagered games may also be displayed to stimulate player interest into additional games that were not wagered on in earlier play. Each of the games (as noted the base game may have all symbols originally displayed, and in that event each of the games means all games in addition to the base game which has additional; frames shown, or all games including the base game if the remaining symbols in the base game have not been displayed) then independently has symbols selected to fill the frames in each of the paylines. Where the symbols are displayed in reels, each of the remaining reels in the base game and the satellite games then stop to display symbols. Each of the games is independently or collectively evaluated to determine if any paylines have predetermined symbol displayed that are to be paid in credits or other awards.

BRIEF DESCRIPTION OF THE FIGURES

FIG. 5 shows a monitor screen and player control panel having a display of a base game showing a three reel base game with a single payline with four satellite games at a specific stage of play.

FIG. 14 shows an introductory screen for play of a variant of the game of the invention referred to as the "Lucky Day!" game.

FIG. 20 shows the first reel of the base or main game of the Lucky Day! game having stopped on the symbol representing August and the first reels on each of the four satellite games also showing the August symbol.

DETAILED DESCRIPTION OF THE INVENTION

Figure 1:
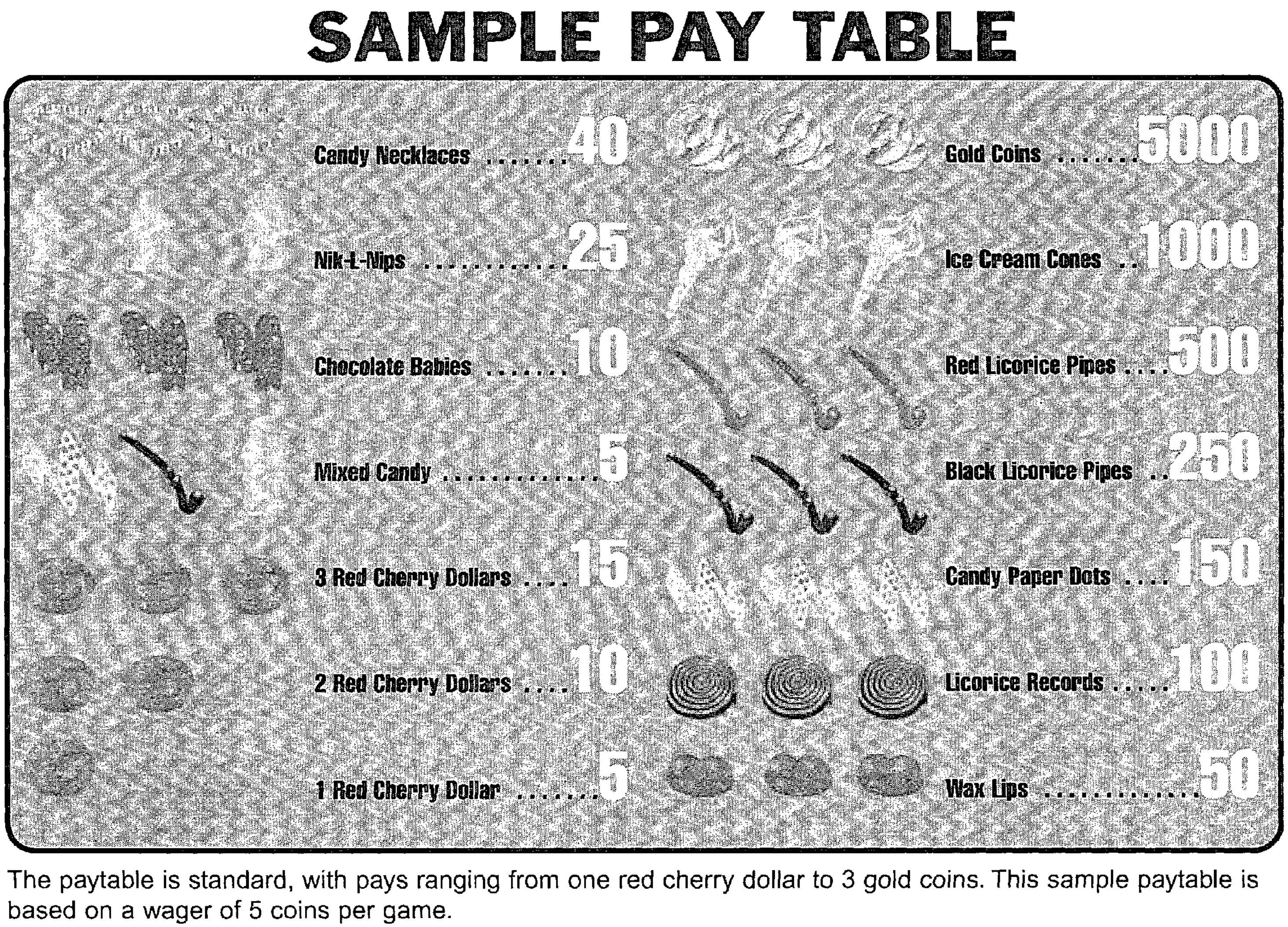
FIG. 1 shows a monitor screen that displays the pay table for a game referred to as "Penny Candy™."

The basic game according to the invention when played in video format can be played with conventional video gaming equipment that has been programmed to execute the rules of play of the game and to provide the images necessary to inform the player of the activity of the game. A standard system would include at least a housing, a display screen, player controls, hardware, processor (distal or proximal intelligence), software, credit/currency/coin handling systems and the like.

There are number of basic ways of playing the game and many variations that may be added to the underlying play of the game. The descriptions and examples provided herein are not to be taken as limiting in the scope of the practice of the invention but are exemplary of the generic scope of the invention described.

One format of play of the invention is to have the base game displayed in larger size then each of the satellite games, but an option is to have all game images in approximately the same size or in various sizes. The base game need not even be prominently displayed, as long as there is one game that may be played if only one game is desired to be played by the player. The position of that game may be varied, and the player may even select which displayed game is to be the base game, even though this would not necessarily or even possibly affect the outcome for that game or any of the games played at that time.

The player wagers whatever multiple of the minimum wager that is desired for play, either by inserting coins, inserting currency, accessing an account, using a credit or debit card, or using credits available on the machine. The player may determine what multiples of the minimum wager are to be wagered and when a single reel game is to be played, the player may wager up to a maximum number of multiples of the minimum amount on that single game. When multiple games are selected to be played (e.g., the base game and at least one satellite game), the wagers may be distributed according to the distributions available in the programming of the machine. It is possible for the player to be able to select how the wagers (in multiples of the minimum wager) are to be distributed among the games played, with or without a limitation on the differential in wagers allowed between games. A preferred method is to have the player select the number of games to be played (e.g., the base game and X number of satellite games) and then have the programming automatically distribute the wagers among those games selected so that the wagers on one game do not exceed a maximum differential as compared to the wager(s) on other games. The most convenient distribution mechanism according to this practice is to set the maximum differential between wagers on games as one unit of the minimum wager. For example, when the player selects four satellite games and one base game to be wagered on and requests that seven (7) unit wagers be placed, the program will automatically distribute the wagers as two (2) units on the base game, two (2) units on a designated first satellite game, and one (1) unit each on the remaining three (3) satellite games to use the full seven (7) unit wager and distribute them as close to equally as possible. It is even possible for the program to round off wagers (either up or down, so as to make the wagers more or less attractive) so that the system may make partial wagers. For example, with the seven (7) wagers placed on a total of five games, the program would treat the wagers as 1.4 units wagered on each game, and the payouts could be made accordingly, with the 1.4 units multiplied in payouts by the return. This may be clearly stated on displays provided on the monitor to inform the player that partial wagers are being placed, and how those wagers are being treated. By adjusting the percentage payout in systems, apparent round-off advantages may be touted for the system (e.g., wagers of 1.4 shall be rounded off to 1.5 units, wagers equal to or in excess of 1.8 units will be rounded off to 2.0), yet the house return can be maintained at acceptable levels. For the convenience of the programmer and simplicity, however, working in whole units is preferred.

After the initial wagers have been placed and the number of games have been selected, the player initiates or the machine automatically initiates the symbol display. The display may be in any format, but the traditional reel-type display is preferred. For example, the displays may be in the format of the base game being a three-by-three display of reels, with the payline being along the center horizontal line of three frames that are shown on the reel. The display of the reels (the base game, any satellite games wagered upon, or the base game and all displayed games (whether or not wagered upon) are 'spun' (virtually shown as spinning), one or more of the spinning reels is stopped in the base game (and either later or at the same time in the satellite games), the symbols in that reel are exposed and (at least with respect to the payline) the symbol shown on the base game is reproduced in the satellite games, preferably in the same position on the reels of the satellite game. Once this first symbol has been established, the random number generator or other gaming play selection system selects or provides symbols in each of the payline positions on the base game display and the satellite game displays. These selections should be independent of one another so that the selection of (in this example) the remaining $2^{nd}$ and $3^{rd}$ symbols in the payline are selected independently for the base game and each of the satellite games that have been wagered upon.

The preferred operation of this method would have the first reel symbol displayed. For example, in the discussed example of the three-by-three reel display, the most left-hand symbol would be displayed first in the base game and then in the satellite games. It is equally possible to have a symbol in any other position displayed first in the base game and then in the satellite games, but it is traditional to stop the left-most symbol first and that does offer some apparent benefits to the player in the practice of the game. For example, where the traditional symbols including cherries are used, the provision of the cherry (or a wild symbol) in the left-most symbol frame would create a winning spin for every satellite game. It is also possible, once the first symbol in the payline of the base game has been displayed to provide that symbol in random or alternative payline positions in the other satellite game reels, but that tends to detract from some of the attributes of play of the game.

Another view of the play of the present invention would be as a machine that enables a method of gaming play comprising playing a wagering game. The game comprises a player placing a wager in a gaming machine. The gaming machine has more than one symbol display system (e.g., more then one set of reels, more then one virtual display of reels, etc.) comprising a first symbol display area and at least a second symbol display area. The symbols themselves may have a potential connected value, such s their intrinsic order or a special relationship (i.e., September-October-November are in order, and November October, and December are a fiscal quarter; June, August and July are Summer vacation, etc.). The first symbol display area and the at least a second display area display a plurality of symbols that are used to determine winning events, such as reel displays for paylines. The first display area provides at least one first symbol. The at least one first symbol display may be in a first position in the first display area or in another position on the display area. After selection of the first symbol, the machine automatically provides that at least one first symbol to the at least second display area. The processor or distal processor (computer) for the gaming apparatus independently and randomly completes symbol display for each of the first display area and the at least second display area. This may be done in any format that is desired by the designer, balancing speed of game play and stimulation of player interest. For example, all reels on all display areas may be stopped at the same time, each symbol provided independently of all other symbols. The main game may be stopped before either the first symbol is provided to the other display areas, or after the first symbol is provided to the main game but before any other symbols are provided to the satellite games. Once the first symbol has been provided in the main game, all of the symbols in the satellite games may be provided in any order or manner with respect to the provision of the remaining symbols in the main game, either before, after or at the same time as the provision of those symbols. There also need not be a specific game that is identified as a main game, and all games may appear equal with the first symbol selected by the random number generator or other symbol providing system being so rapidly distributed among all symbol display areas that no "main game" can be readily identified by the player. After all symbols have been provided in all symbol display areas, the processor determines if winning events are present in the first display area and the at least second display area. The term "main game" is thus indicative of events and is not limited to any specific display area. The provision of a main game display area that is so specifically identified provides an aesthetic benefit, but is not fundamental to one aspect of the underlying play of the game. For example, when the processor selects a first symbol, that same first symbol may be provided to all display areas, and then the remaining symbols may be provided to all remaining wager areas (e.g., all wagered areas or all display areas) in any format. The symbols may be provided to one display area at a time, all of the display areas at the same time, or in a sequence of display areas.

Reference to the Figures will assist in a further understanding of the practice of the present invention.

FIG. 1 shows a monitor screen 2 that displays the pay table 4 for a game referred to as "Penny Candy™" in this discussion. Various symbols 6 are shown, and the pay table 4 scales are based on a wager of five units per game.

Figure 2:
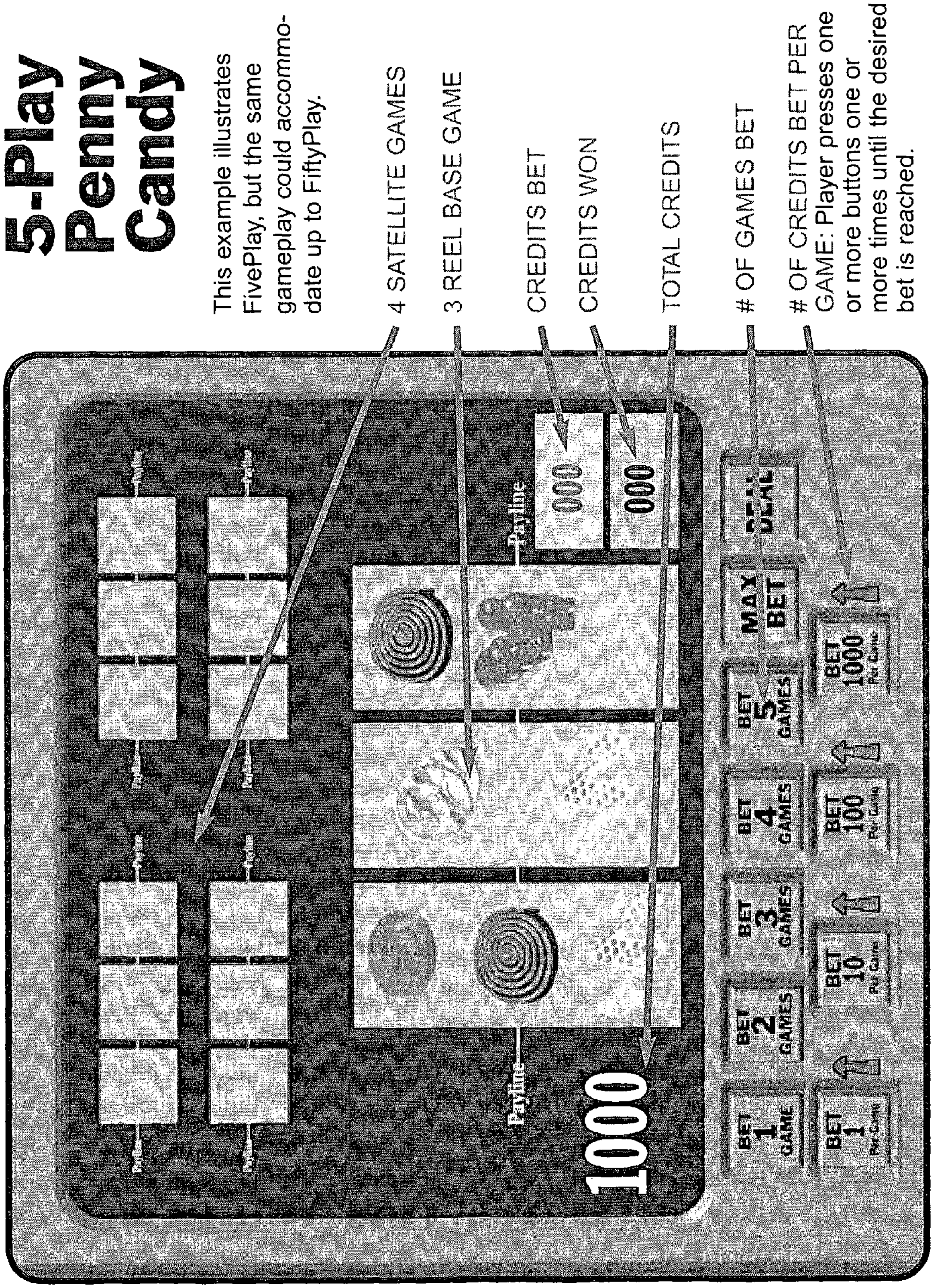
FIG. 2 shows a monitor screen and player control panel having a display of a base game showing a three reel base game with a single payline with four satellite games.

FIG. 2 shows a monitor screen 20 and player control panel 30 having a display of a base game 22 showing a three reel (24, 26, 28) base game 22 with a single payline 32. Four satellite games 34, 36, 38 and 40 are shown (with only single paylines, 42, 44, 46 and 48 shown). Other typical information may be displayed on the monitor screen 20 such as credits bet 50, credits won 52, and total credits available 54. The player control panel 30 may have the usual player control features and additional features that are unique to Penny Candy™ game play. For example button 56 shows that the maximum of five games are wagered, and buttons 58 are used to select the number of wagers placed per game. By using different combinations of buttons 58, wagers from 1 to a maximum number allowed (e.g., 10,000) may be selected.

Figure 3:
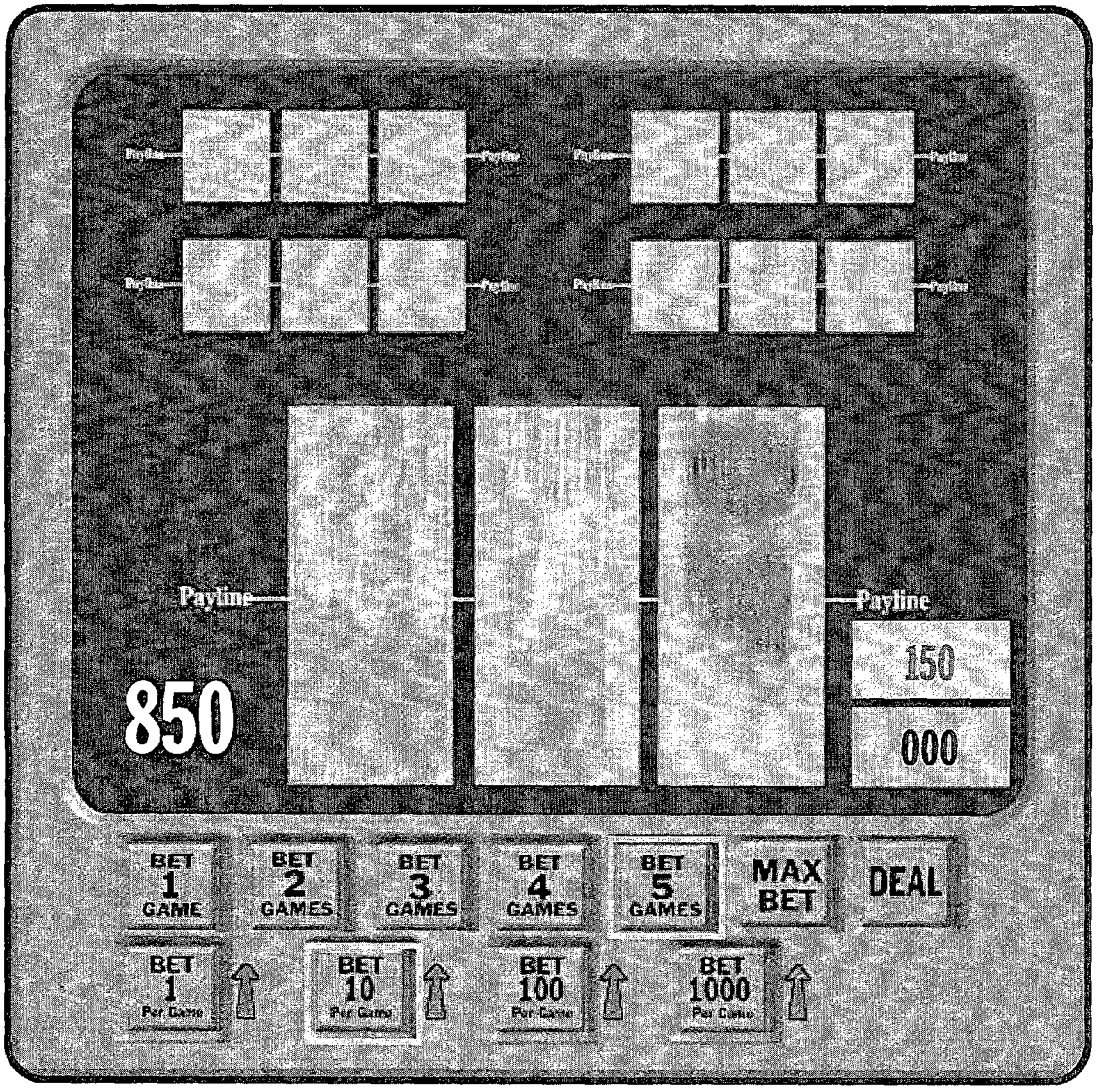
FIG. 3 shows a monitor screen and player control panel having a display of a base game showing a three reel base game with a single payline with four satellite games at a specific stage of play.

FIG. 3 shows the initiation of a game of Penny Candy™ game play shown on a monitor screen 20. The base game reels 22 are shown spinning, the wagers placed 50 are shown as 150 units, the credits won 52 is shown as 000 as the game has not been determined, and the Total credits available 54 is shown as 850.

Figure 4:
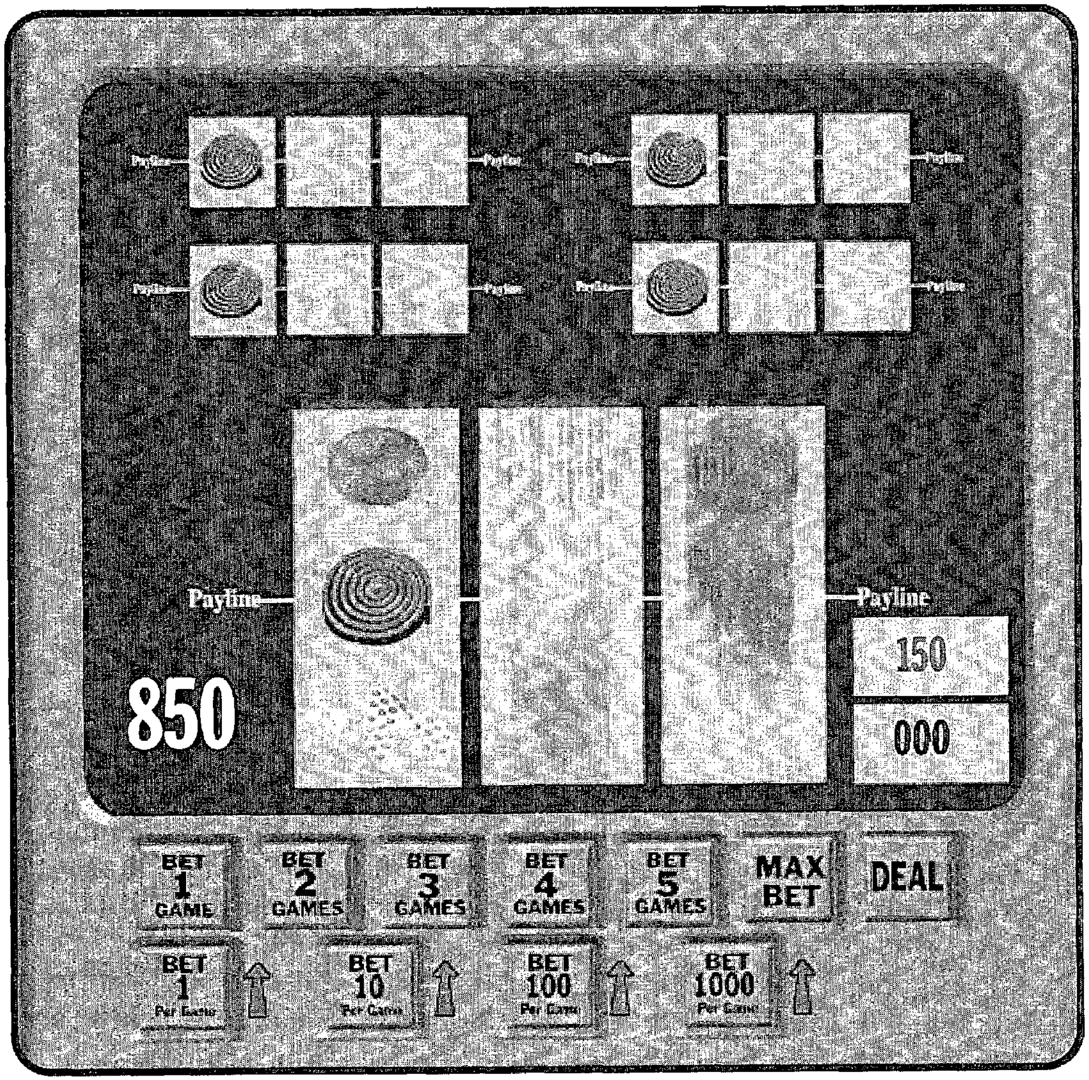
FIG. 4 shows a monitor screen and player control panel having a display of a base game showing a three reel base game with a single payline with four satellite games at a specific stage of play.

FIG. 4 shows the monitor screen 20 in an advanced stage of the play of the game from FIG. 3. Here, the left-most reel 24 has stopped its virtual spinning, and a symbol 60 (which happens to be a licorice record) is displayed on the payline 32. The symbols 62 and 64 are not important to the play of the game in this format. It is possible, as is known in other gaming formats, for additional paylines to be present, such as along lines 66 and 68 that are parallel to the payline 32 or paylines that are diagonal in the array of frames provided by reels 24, 26 and 28. Upon stopping reel 24 and the display of symbol 60 in the payline 32, the identical symbol (which may include a blank space, as is understood in the art) is then or simultaneously displayed on satellite paylines 42, 44, 46 and 48. As is shown in this format, the same symbol 60 of the licorice record shown in the first frame of the payline 32 is shown in the first frame of satellite paylines 42, 44, 46 and 48. As noted earlier, this same symbol 60 may be shown in other positions, but for simplicity and other player tolerance issues, the format shown in FIG. 4 is preferred. Reels 26 and 28 are displayed as virtually continuing to spin. At this point in the play of the Penny Candy™ game, the program for selecting symbols to complete the displays on the reels would engage. This program is usually in the form of a random number generator selecting symbols, reel stop positions, specific symbol combinations or the like. Any other system for selecting symbols or outcomes for each of the games (the base game and the satellite games) may be used in the practice of the invention.

FIG. 5 shows a monitor screen 20 with the Penny Candy™ game of FIGS. 3 and 4 at a further advanced stage. After reel 24 has been stopped in the base game, reel 26 has now been stopped showing a blank space along the payline 32 in the second reel 26. The first frames 78, 84, 90 and 96 on the four satellite paylines paylines 42, 44, 46 and 48 are shown as identical to the symbol 60 on the payline 32 in the base game reel 24. In stopped reel 26, symbols are shown on the stopped reel 26, with a blank space displayed on the payline 32 of the base game. At about the same time or after stopping the reel 26 on the base game, the second virtual reels in the satellite games are stooped, displaying symbols 80, 86, 92 and 98 in the second frame of the paylines 42, 44, 46 and 48. These selections, as can be seen, are independent of the selection of the blank space in the payline 32 of the base game. The symbols displayed in frames 80, 86, 92 and 98 in the second frame of the paylines 42, 44, 46 and 48 are respectively a blank, an ice cream cone, a licorice record and black licorice pipe. At the same time, the virtual third reel 28 of the base game is still spinning, as are all third reels in paylines 42, 44, 46 and 48.

Figure 6:
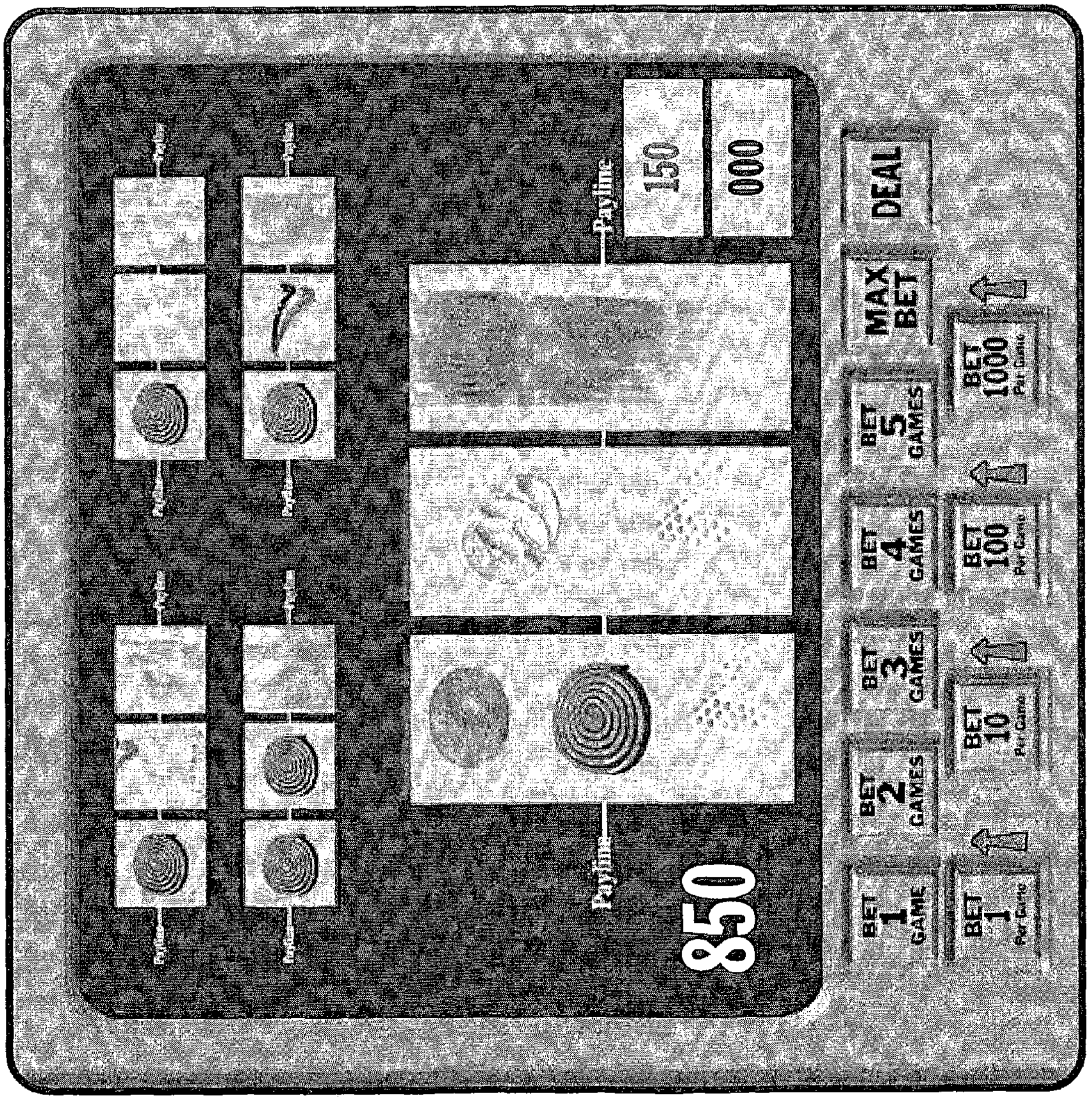
FIG. 6 shows a monitor screen and player control panel having a display of a base game showing a three reel base game with a single payline with four satellite games at a specific stage of play.

FIG. 6 shows a monitor screen 20 with the Penny Candy™ game of FIGS. 3, 4 and 5 at a further advanced stage. The third reel 28 in the base game has been stopped and symbol 102 displayed along the base game payline 32 Symbols 82, 88, 94 and 100 have also been displayed along the four satellite game paylines 42, 44, 46 and 48. As all reels have been stopped, the program may now determine winnings and losses. In this format, payout panels 102 and 104 display the collective winnings for paylines 42 and 44 and for paylines 46 and 48. Payout panels may be provided individually for each payline in base game and satellite games. The payout panels 104 and 106 show the amount of winnings (600 units and 30 units) from the collective paylines 42 and 44 and for paylines 46 and 48. The total credit status is displayed by showing the wagered amount 50, the credits won 52 and the total credits available 54 on the monitor screen 20.

Figure 7:
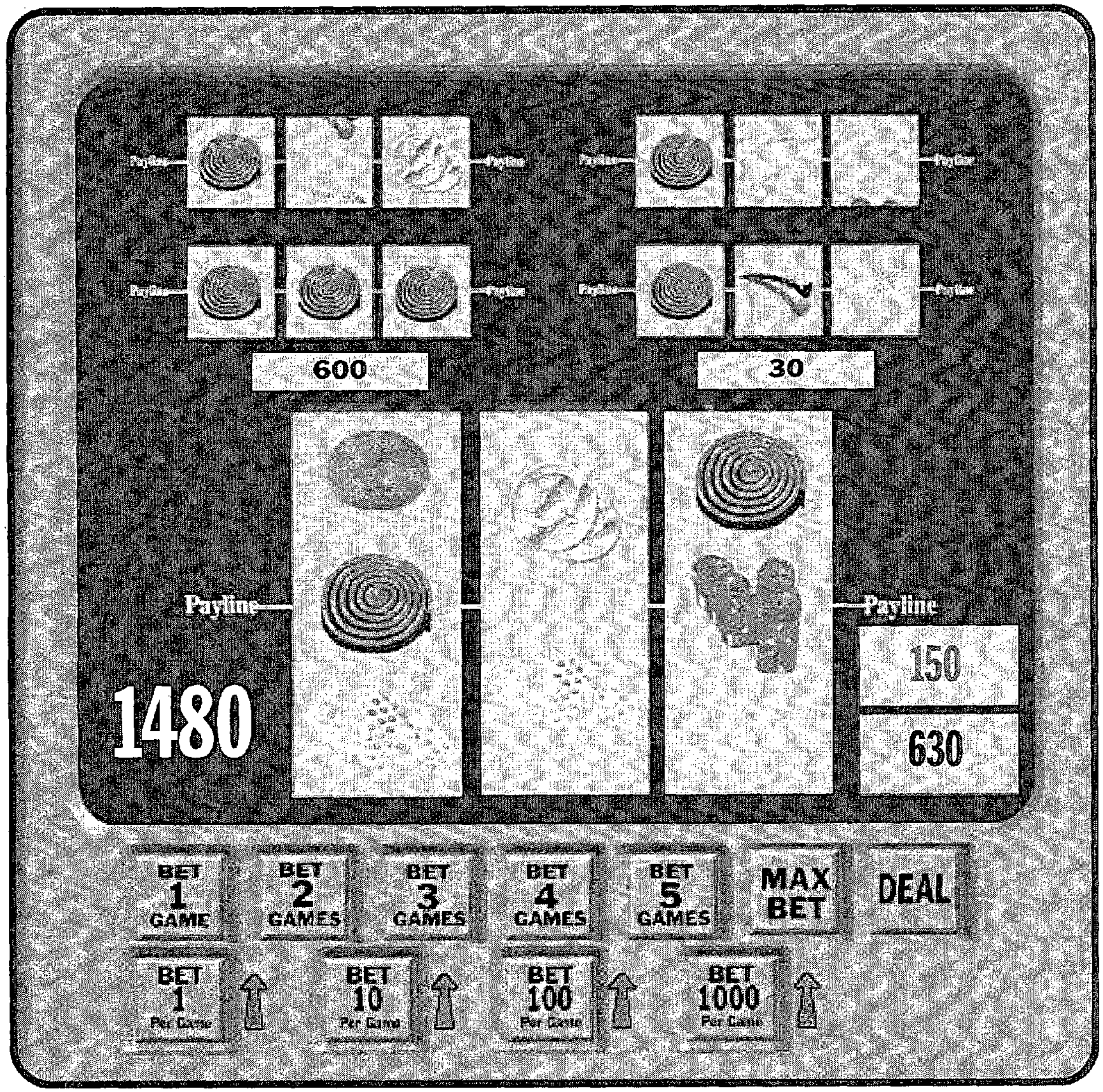
FIG. 7 shows a monitor screen and player control panel having a display of a base game showing a three reel base game with a single payline with four satellite games at a specific stage of play.
Figure 8:
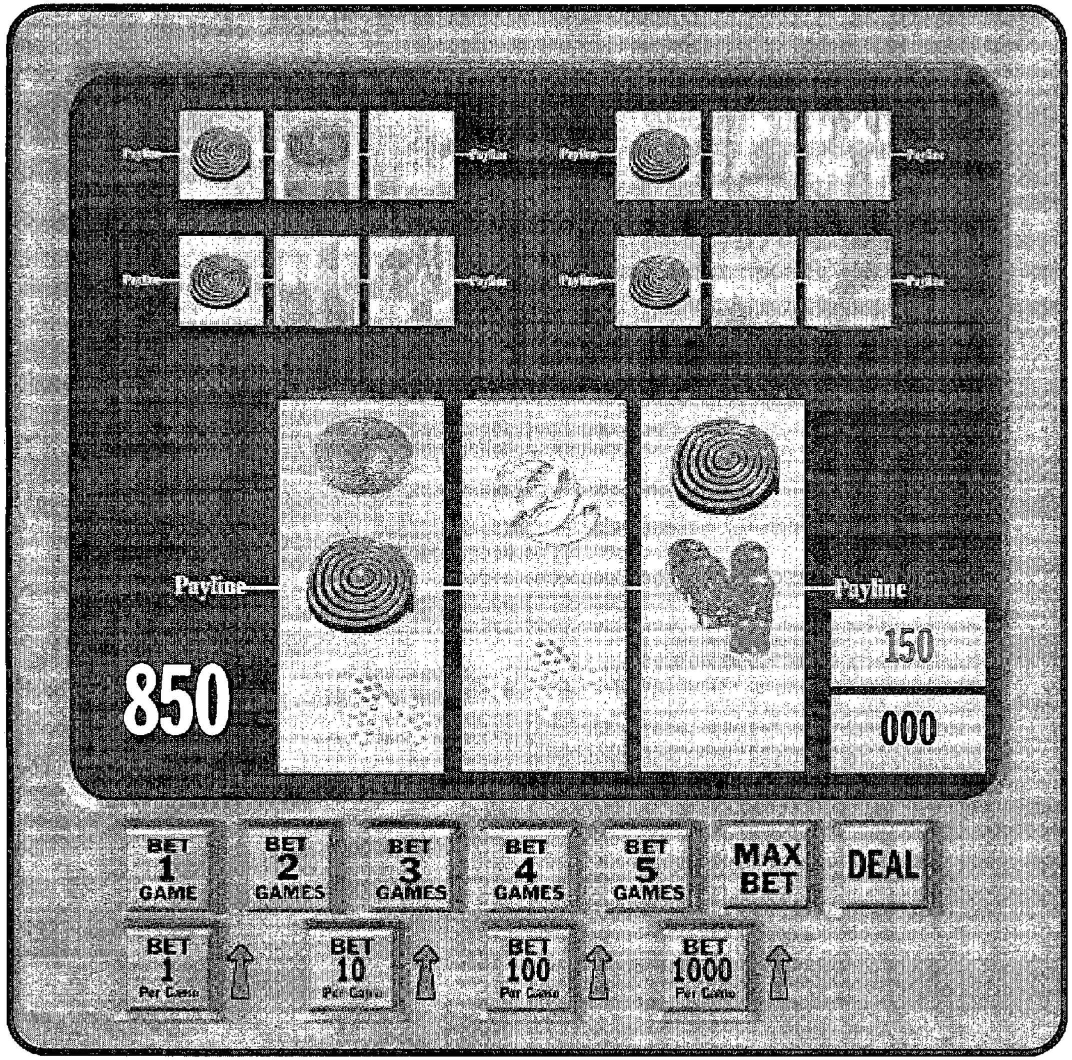
FIG. 8 shows a monitor screen and player control panel having a display of a base game showing a three reel base game with a single payline with four satellite games at a specific stage of play.
Figure 9:
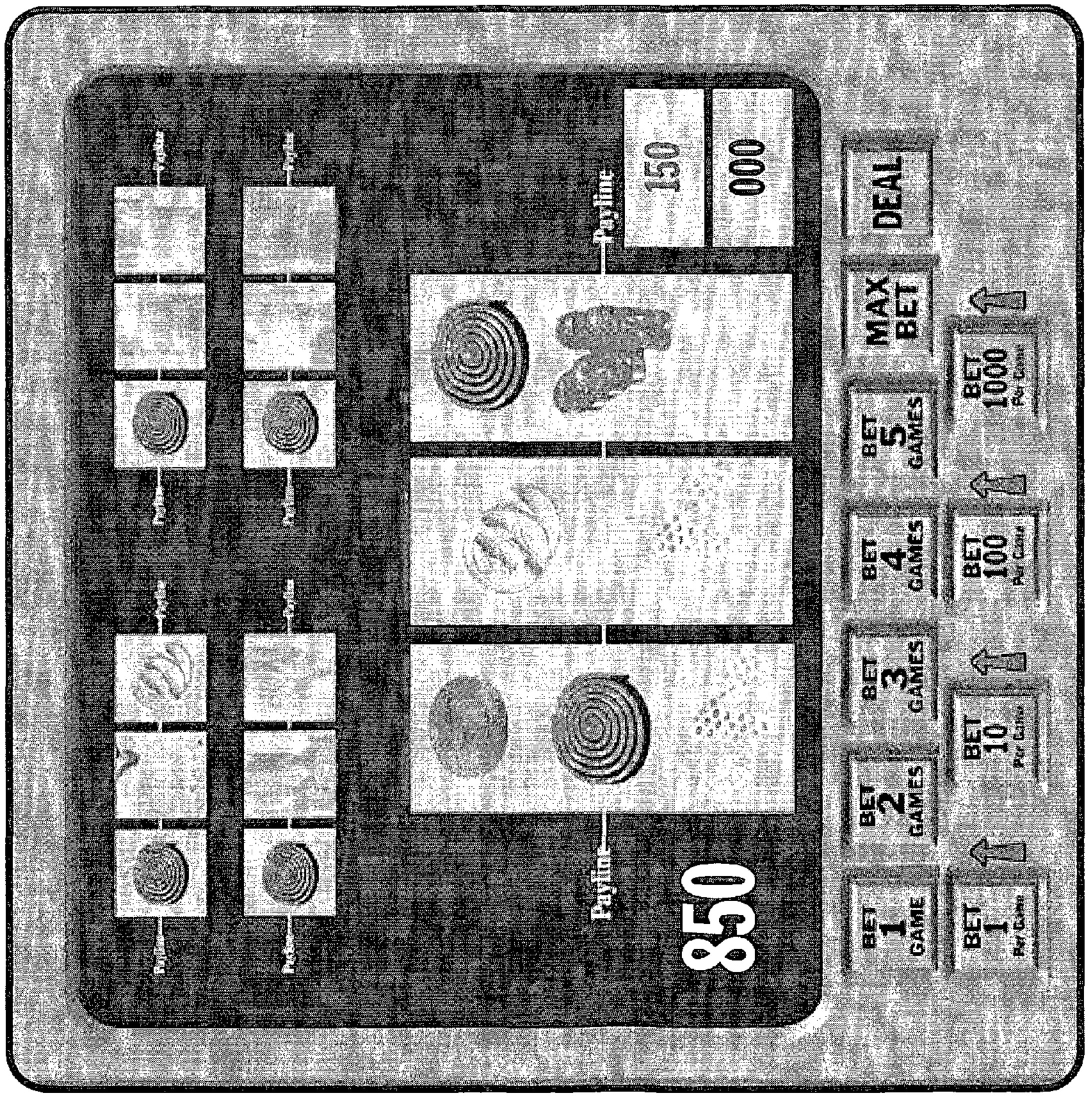
FIG. 9 shows a monitor screen and player control panel having a display of a base game showing a three reel base game with a single payline with four satellite games at a specific stage of play.
Figure 10:
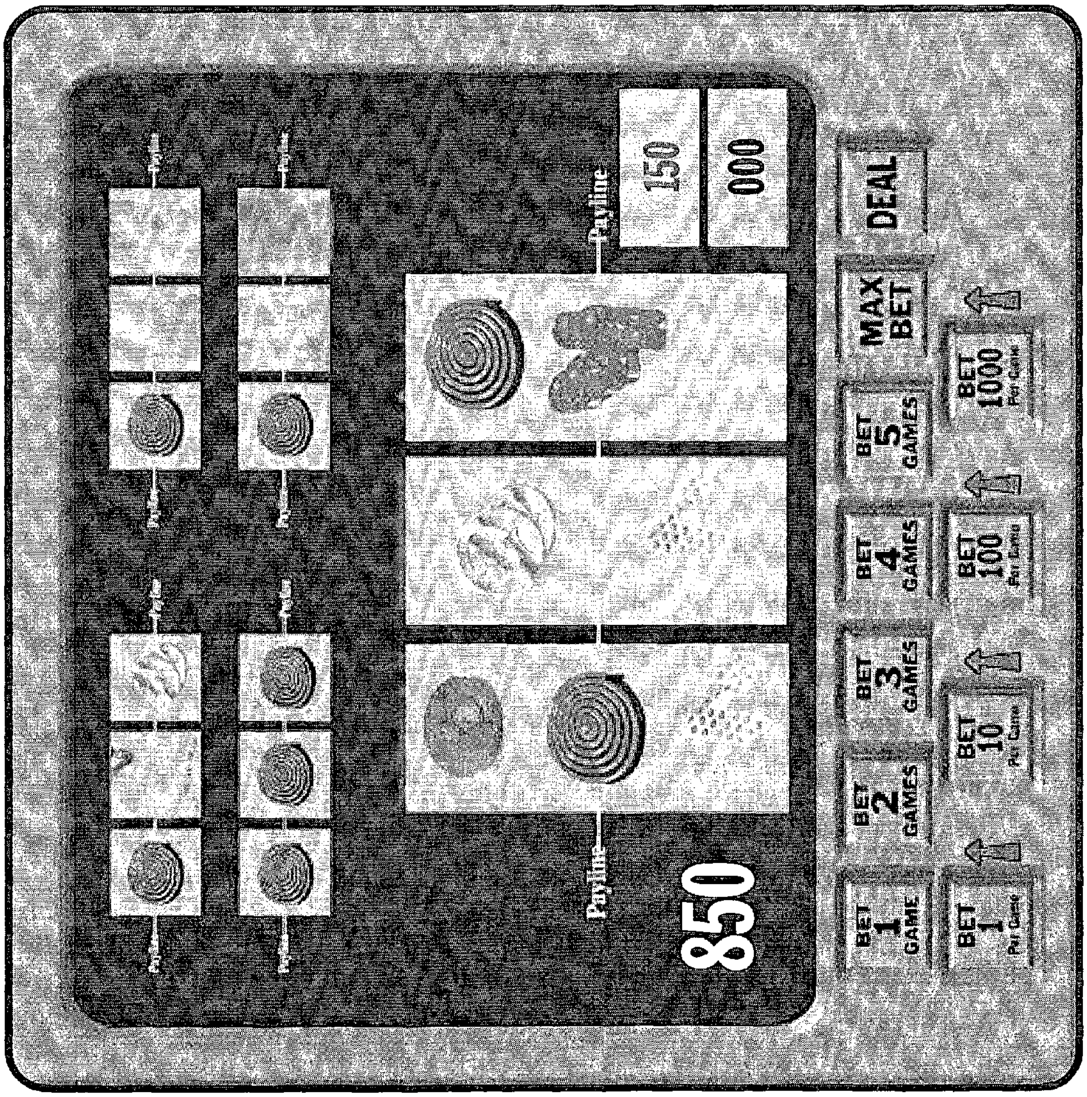
FIG. 10 shows a monitor screen and player control panel having a display of a base game showing a three reel base game with a single payline with four satellite games at a specific stage of play.
Figure 11:
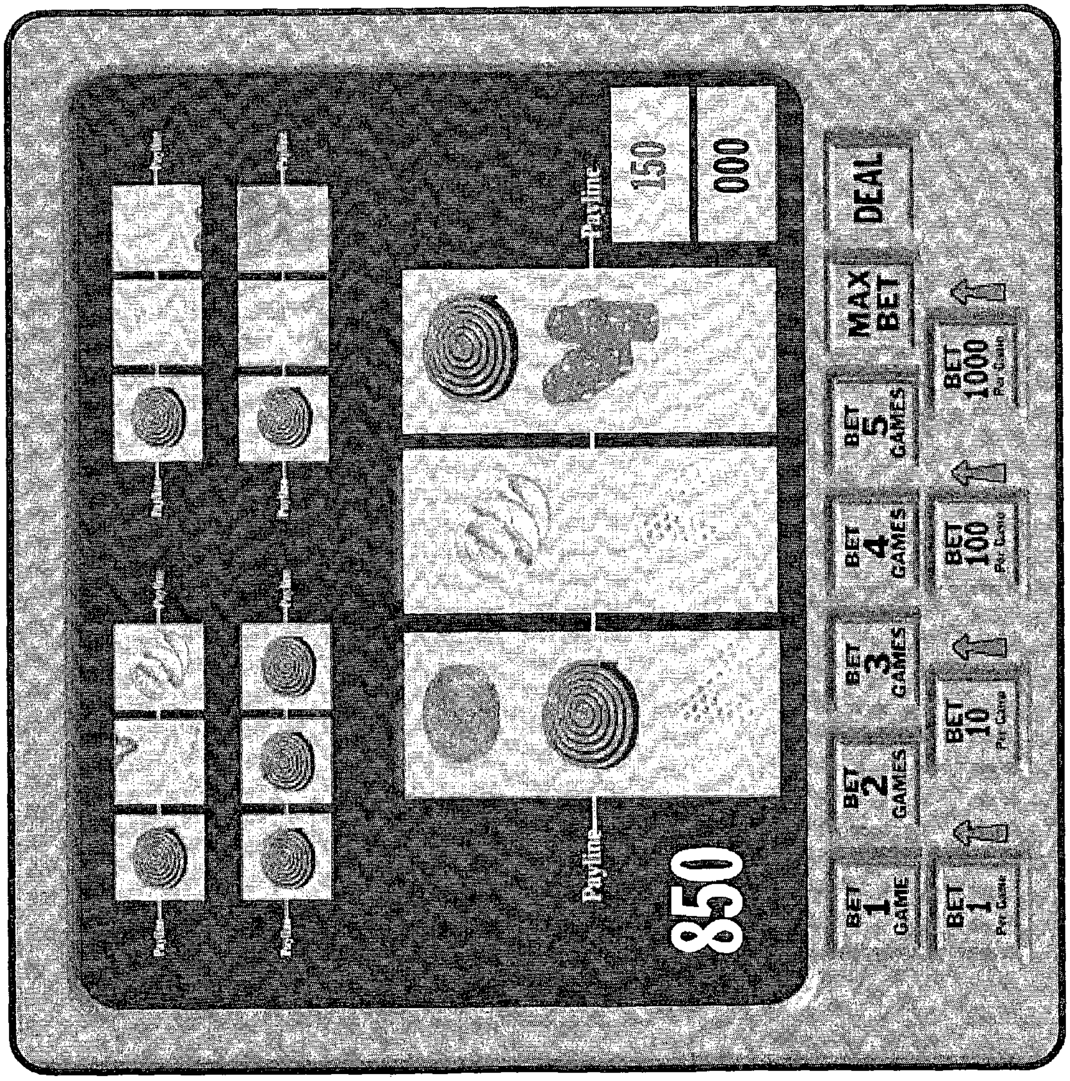
FIG. 11 shows a monitor screen and player control panel having a display of a base game showing a three reel base game with a single payline with four satellite games at a specific stage of play.
Figure 12:
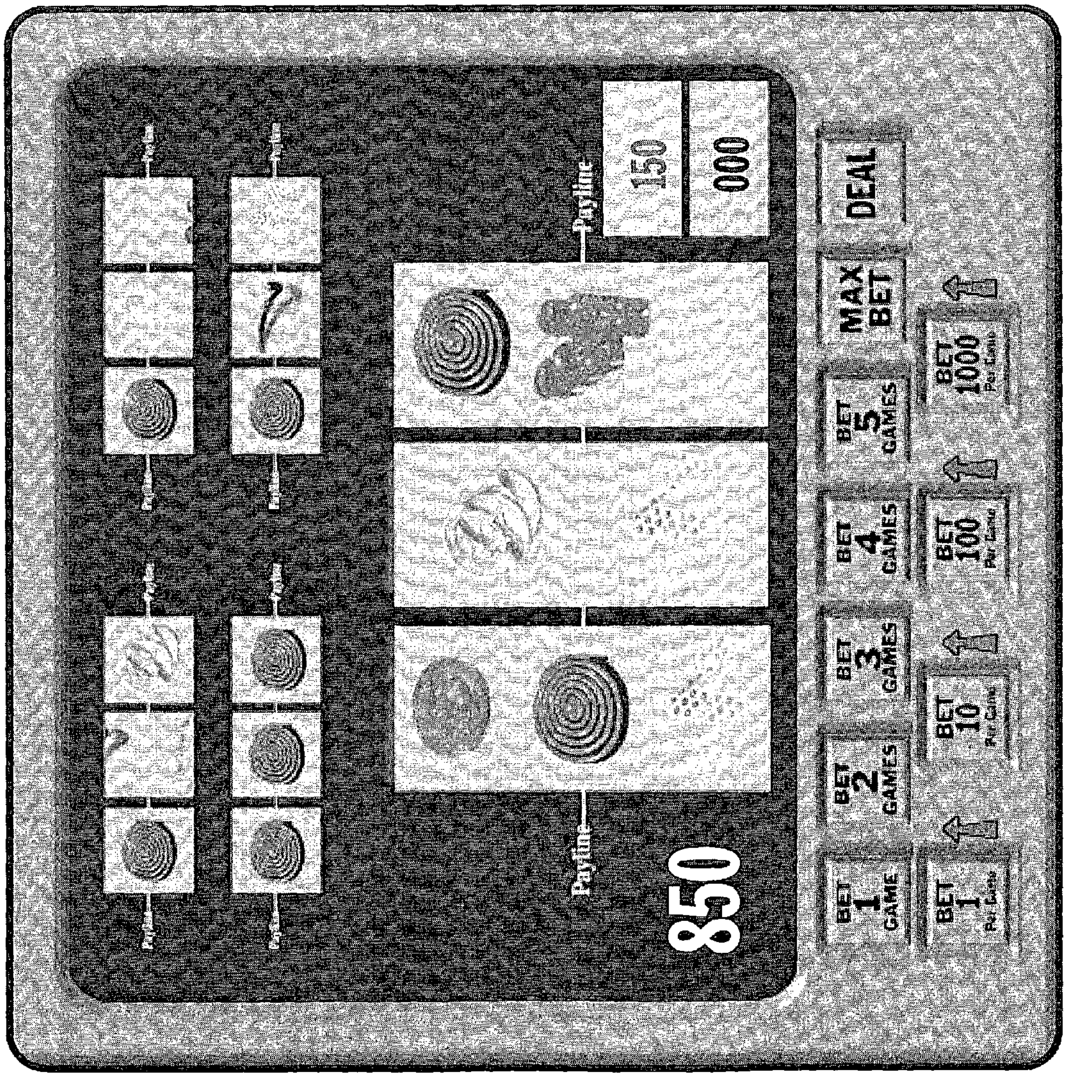
FIG. 12 shows a monitor screen and player control panel having a display of a base game showing a three reel base game with a single payline with four satellite games at a specific stage of play.
Figure 13:
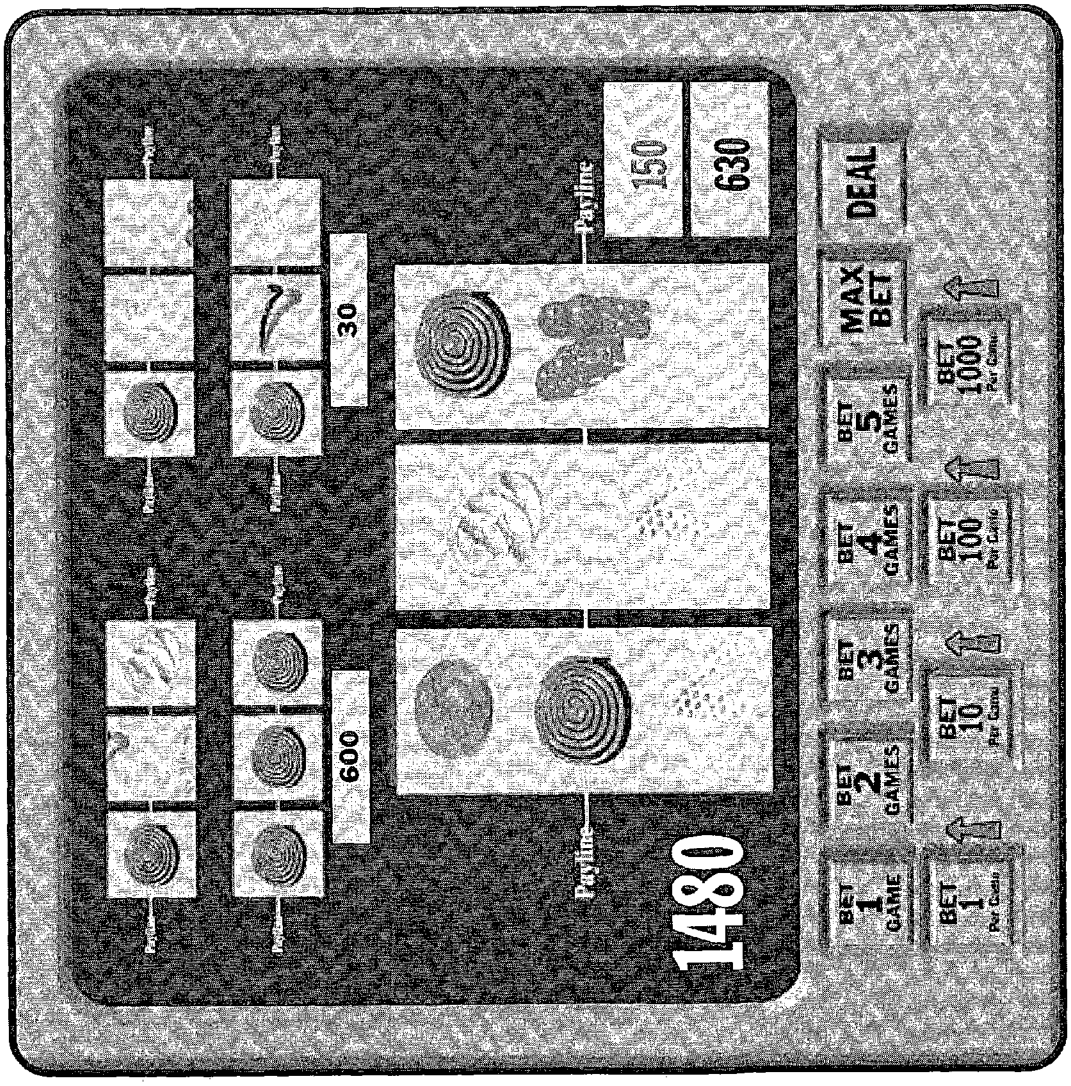
FIG. 13 shows a monitor screen and player control panel having a display of a base game showing a three reel base game with a single payline with four satellite games at a specific stage of play.
Figure 15:
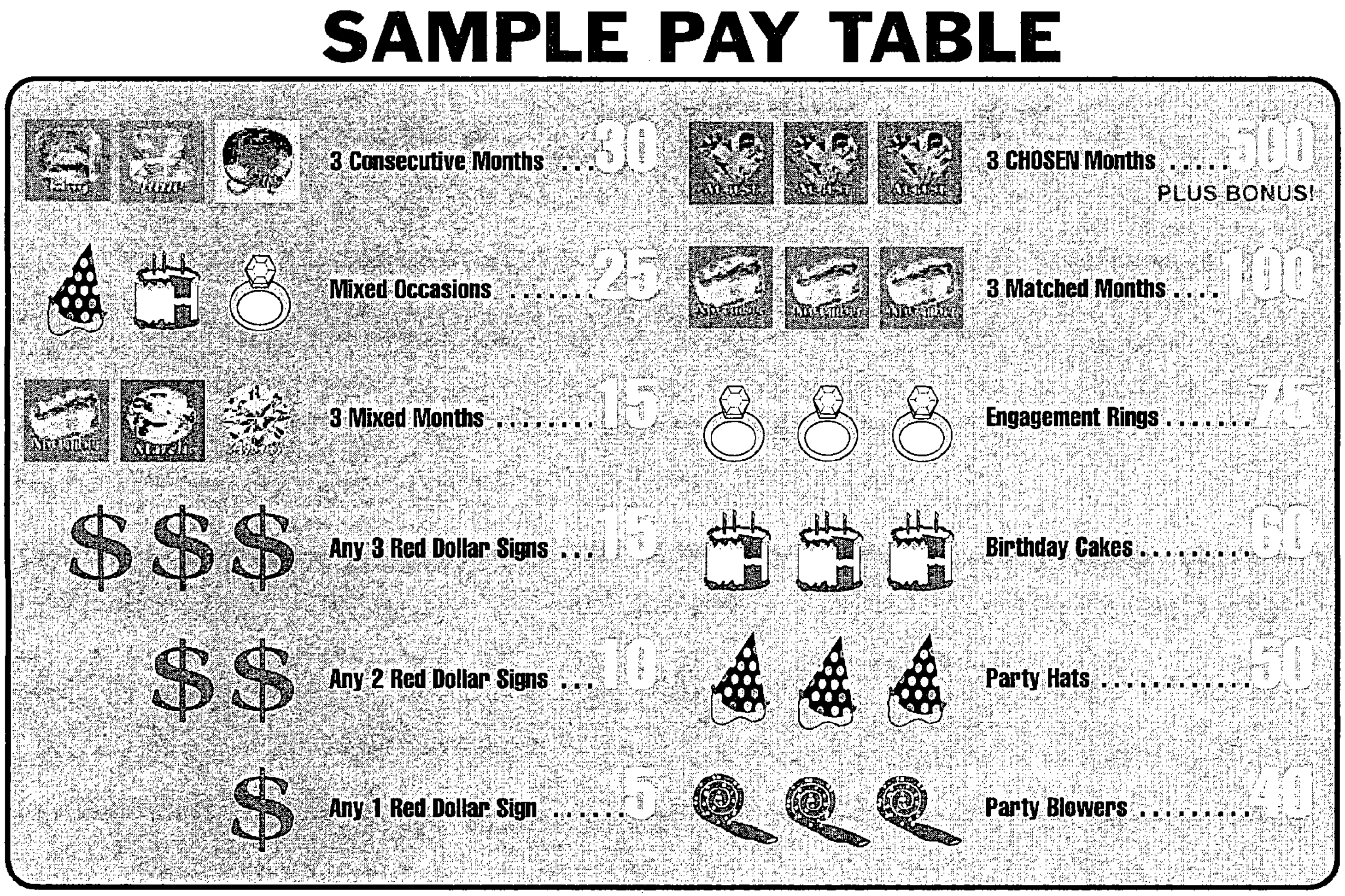
FIG. 15 shows a sample pay table for the Lucky Day! game.
Figure 16:
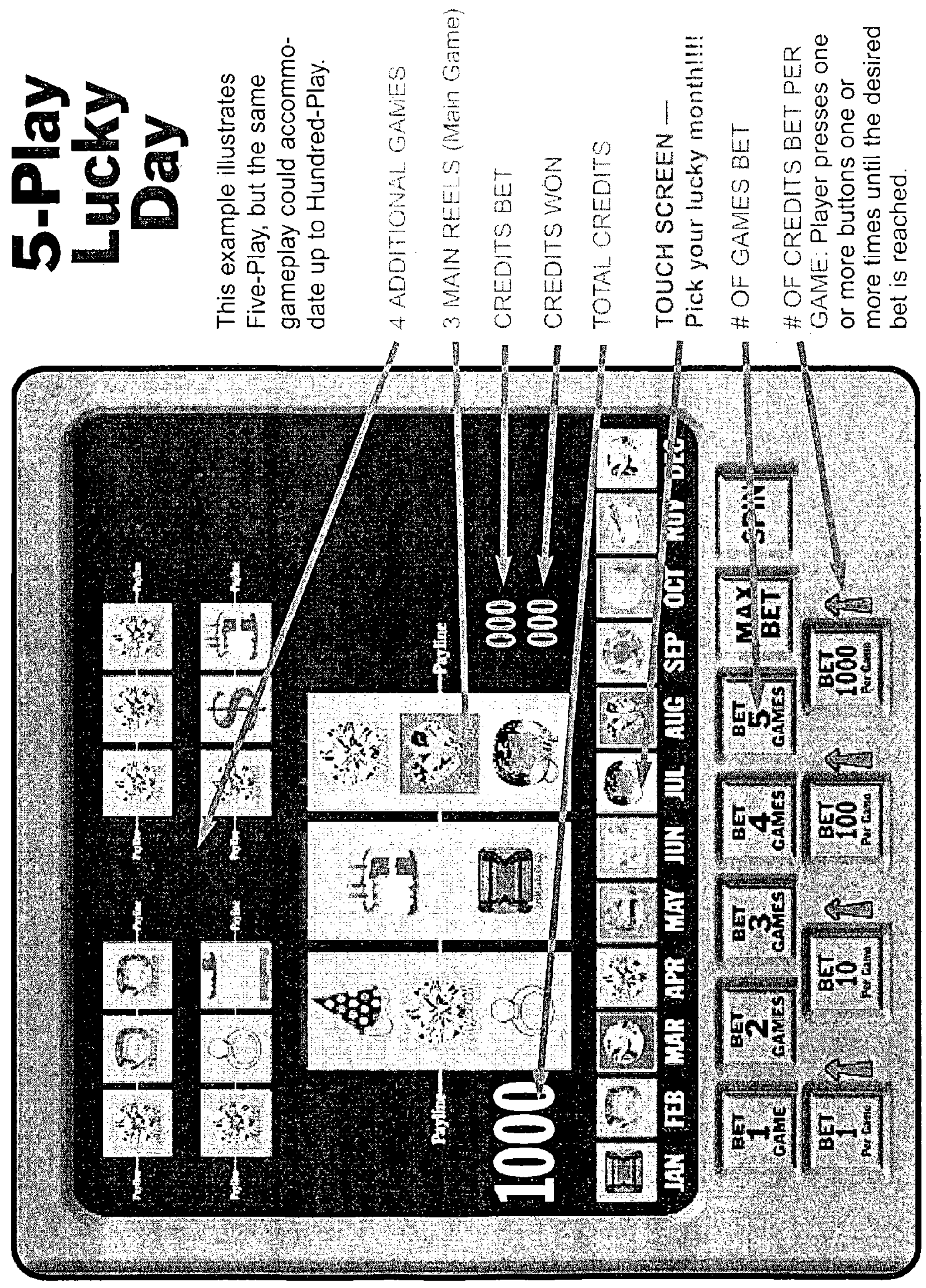
FIG. 16 shows a completed screen at the end of play of the Lucky Day! game.
Figure 17:
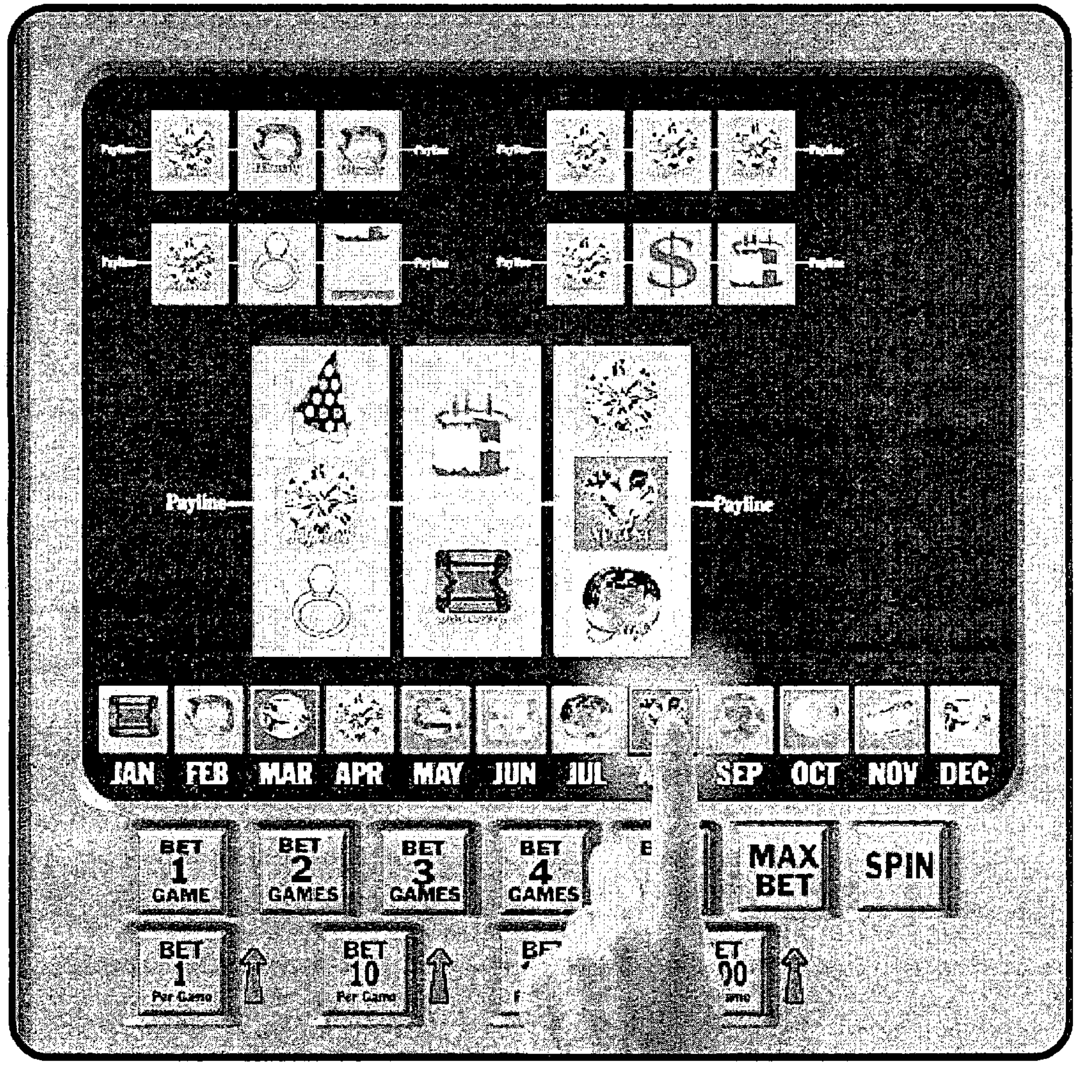
FIG. 17 shows initiation of play of the Lucky Day! game by manual engagement of a button indicating a month.
Figure 18:
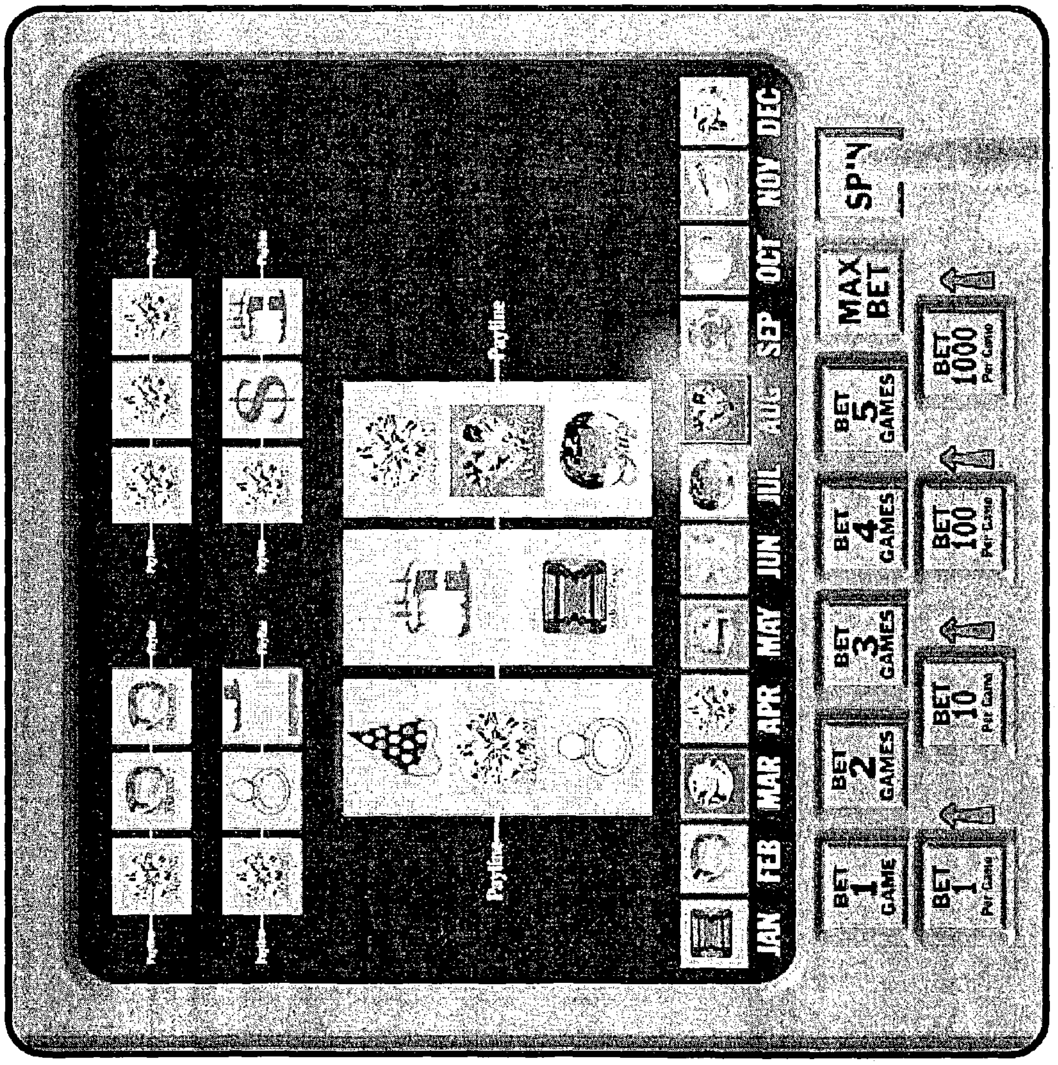
FIG. 18 shows manual entry of a spin command after selection of a month as in FIG. 17.
Figure 19:
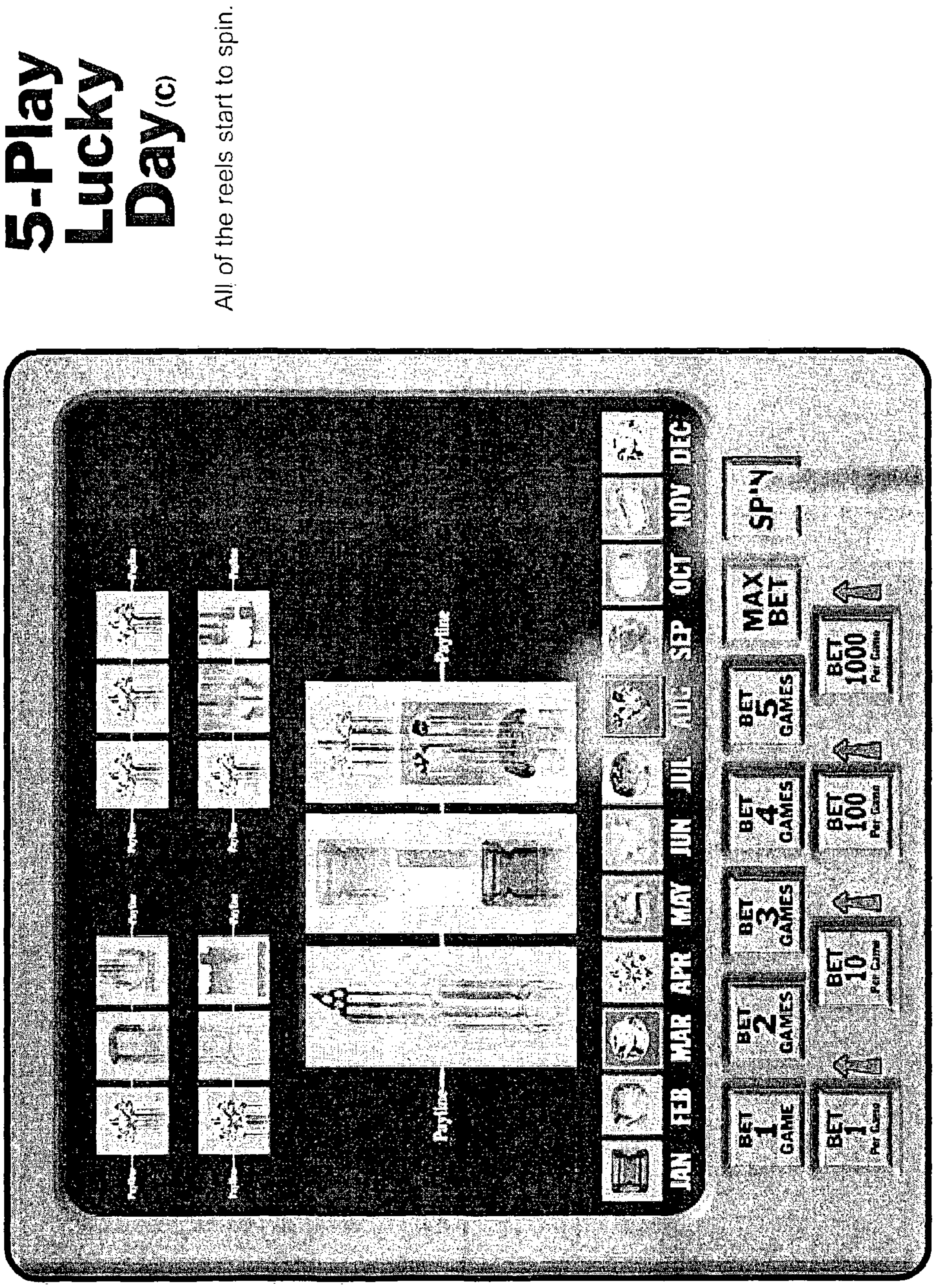
FIG. 19 shows the three reels of the base or main game spinning at the same time that the three reels of each of the four satellite games are spinning.
Figure 21:
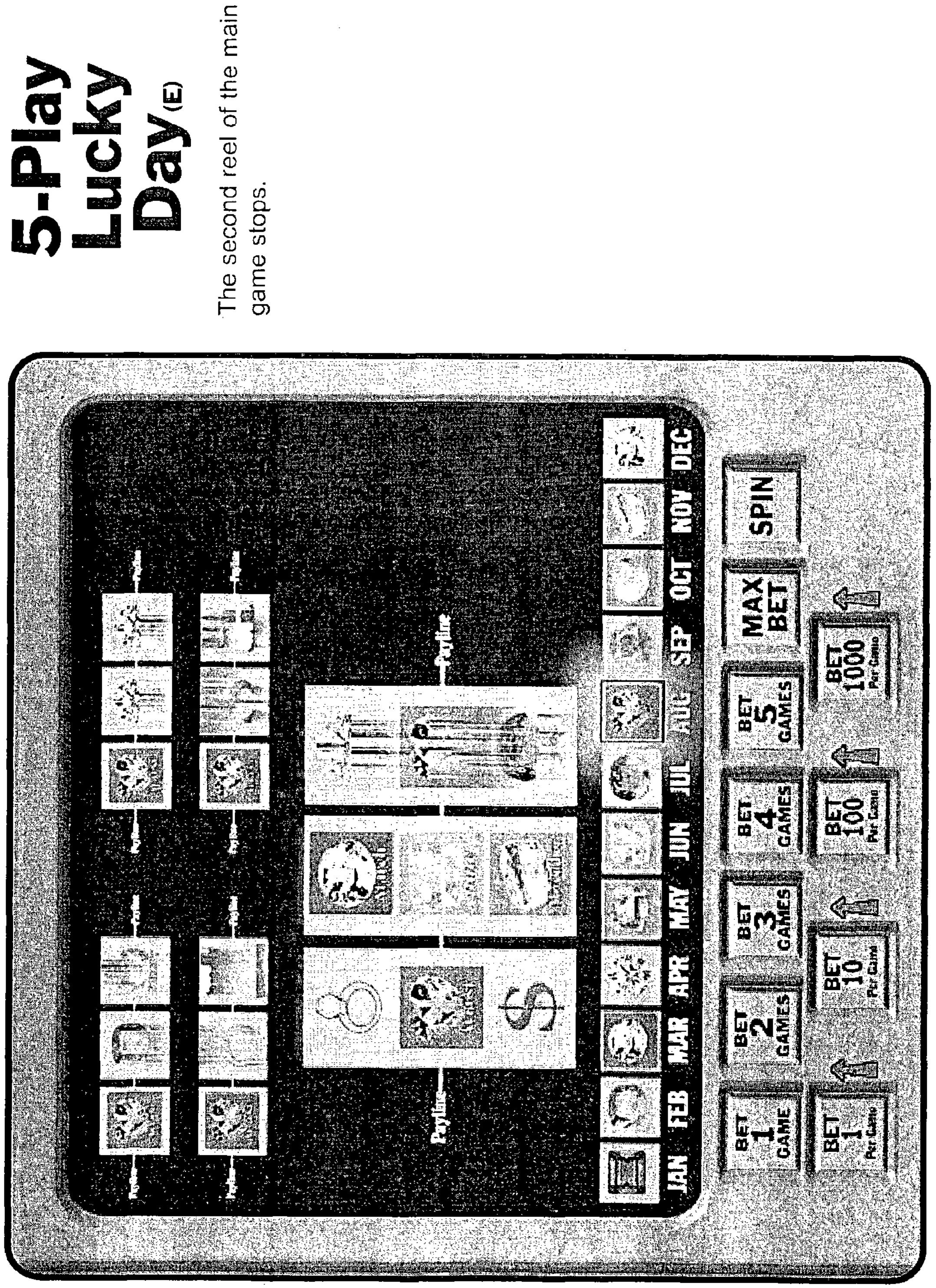
FIG. 21 shows the second reel of the base or main game of the Lucky Day! game having stopped, while the second reels on each of the four satellite games remain spinning.
Figure 22:
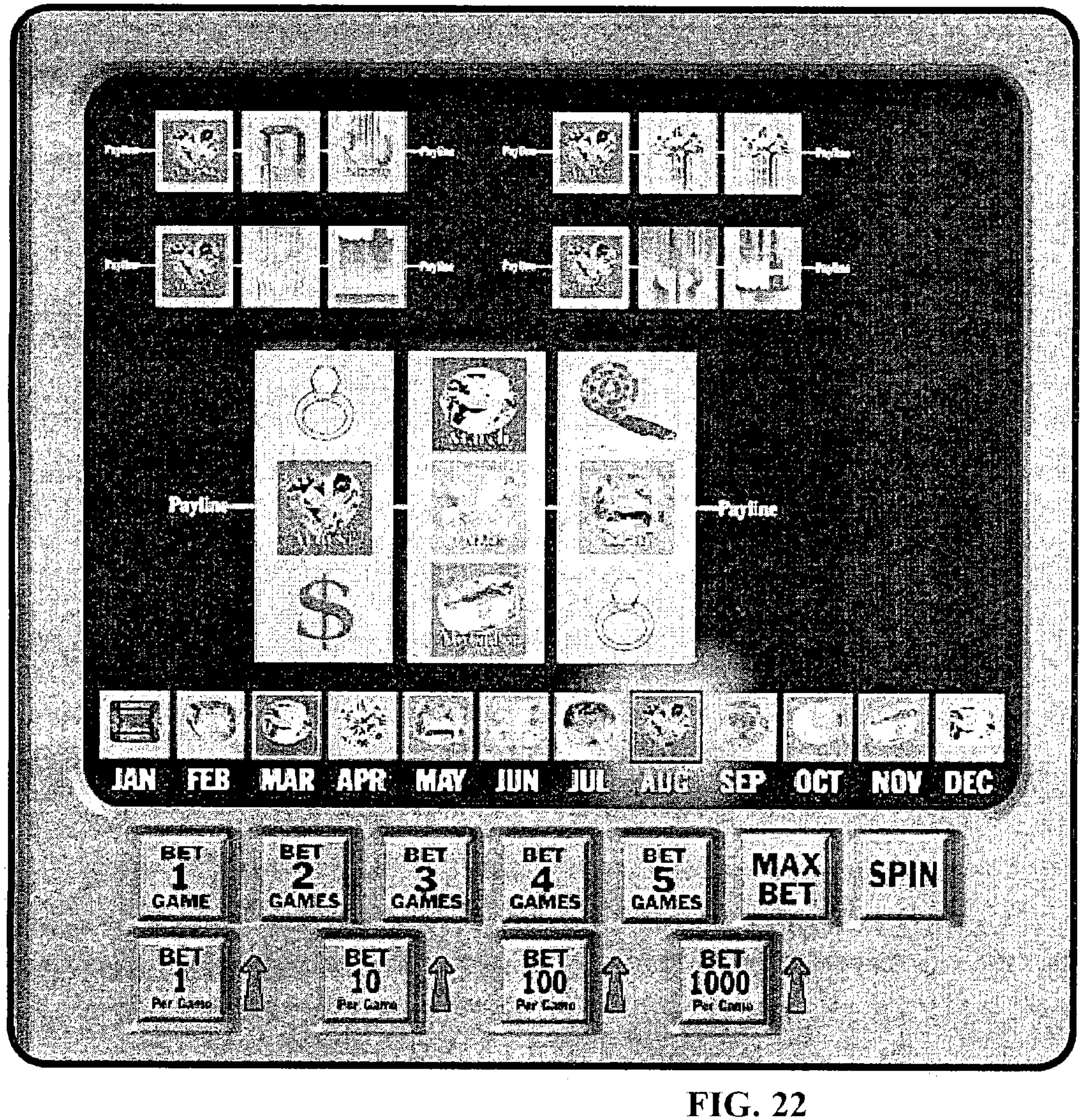
FIG. 22 shows the main or base game reels with the first, second and third reels stopped, while only the first reel in each of the four satellite games has stopped.
Figure 23:
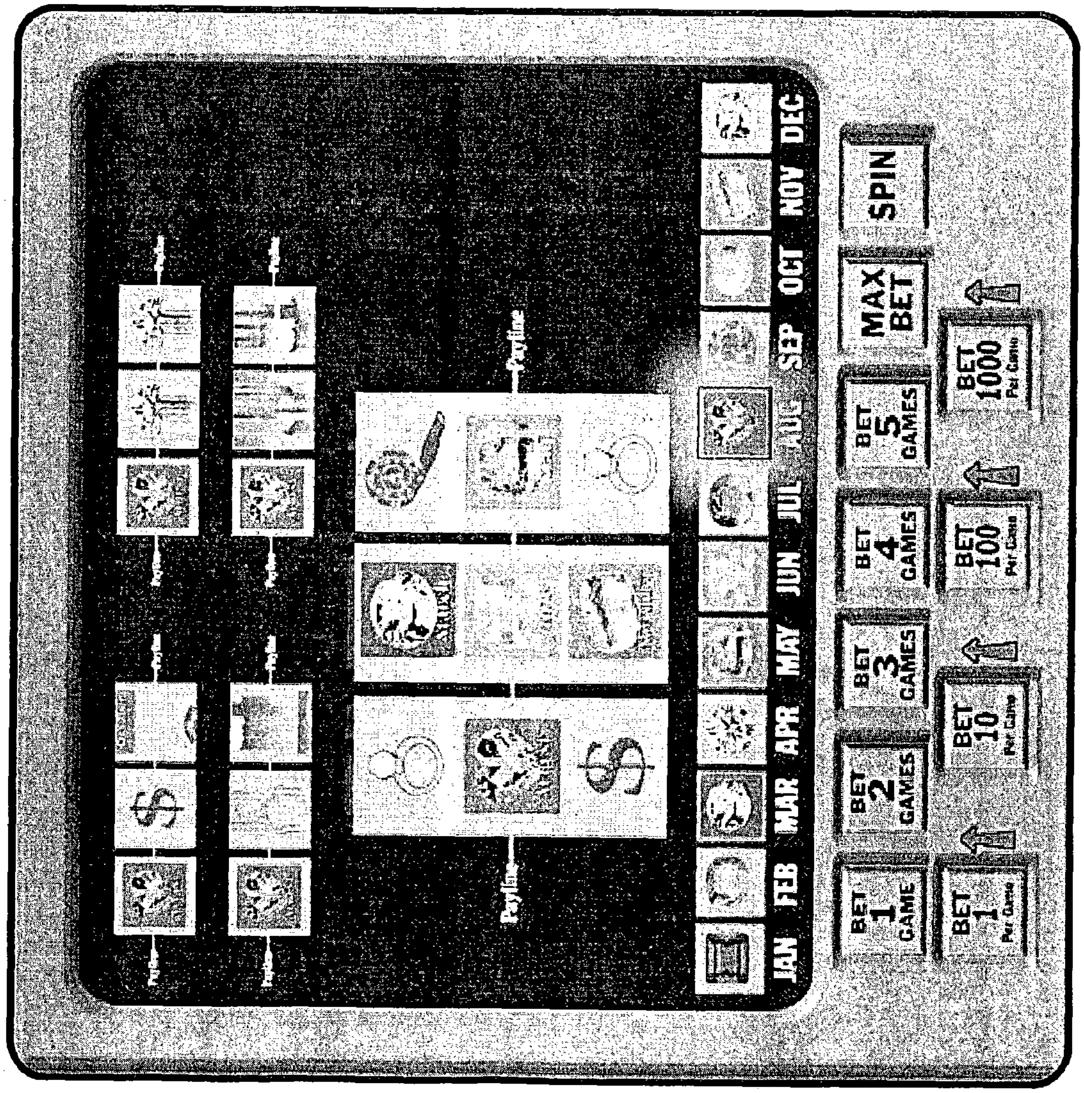
FIG. 23 shows the second reel of the first of the four satellite games having stopped, while the second and third reels of the second, third and fourth satellite games are still spinning.
Figure 24:
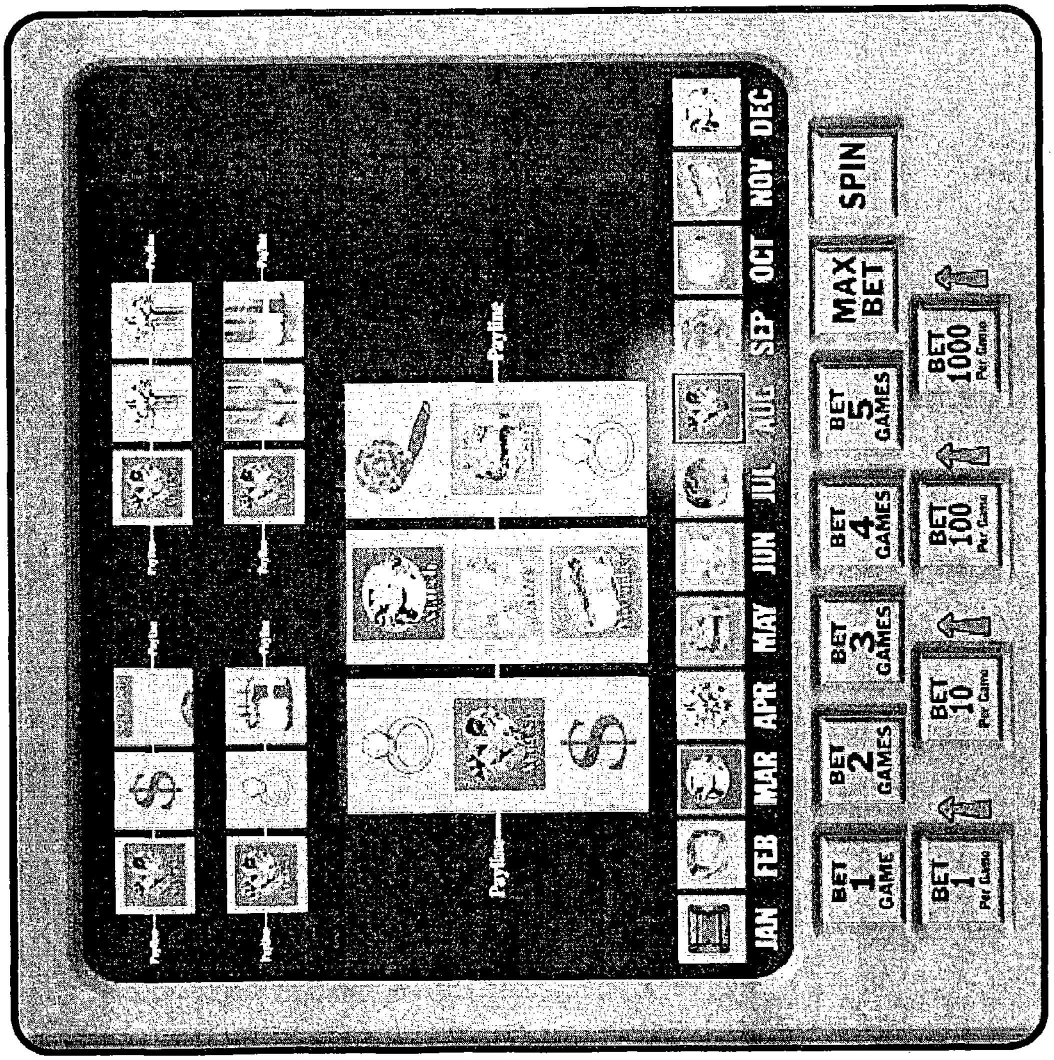
FIG. 24 shows the second and third reels of the first and second of the four satellite games having stopped, while the second and third reels of the third and fourth satellite games are still spinning.
Figure 25:
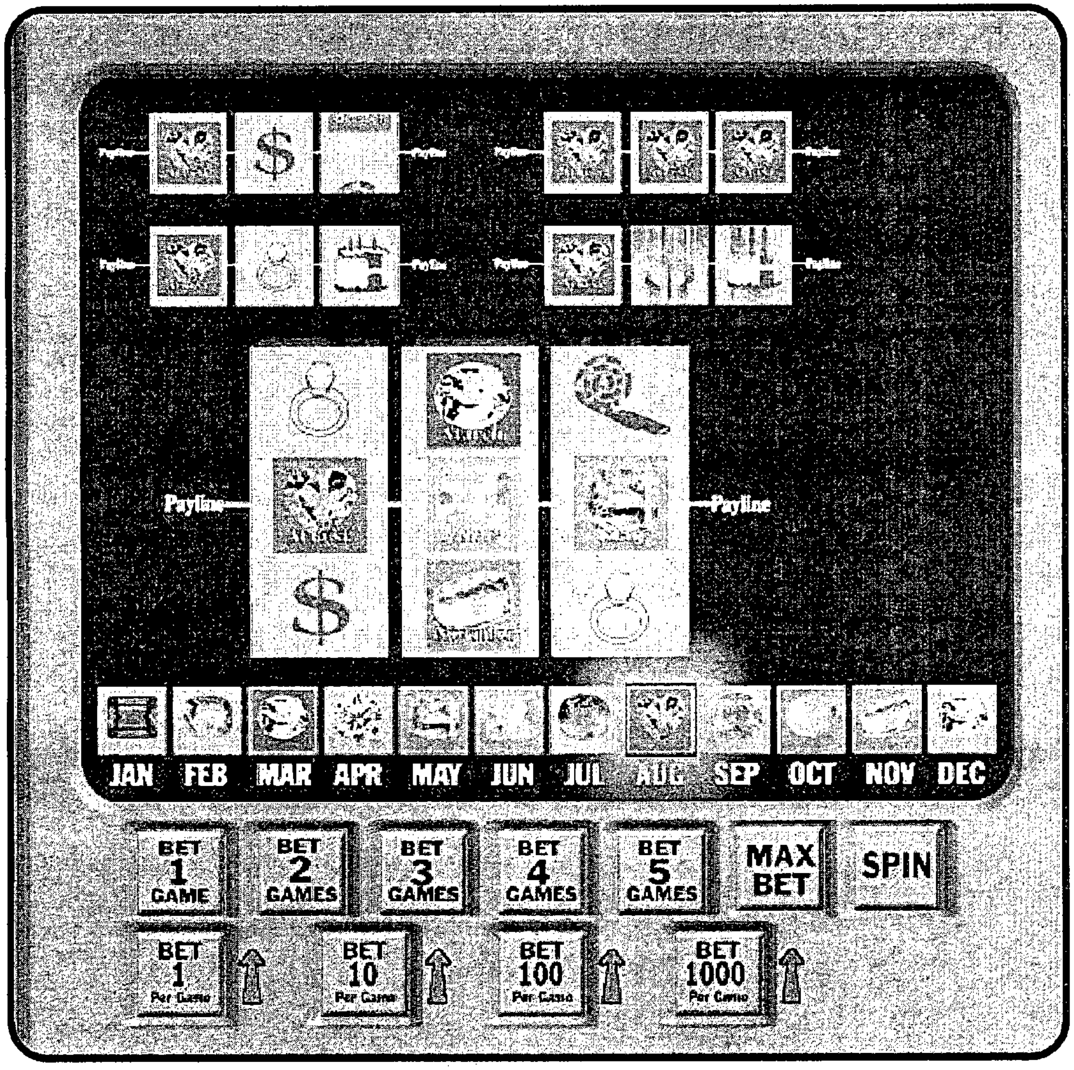
FIG. 25 shows the second and third reels of the first, second and third of the four satellite games having stopped, while the second reels of the fourth satellite game are still spinning.
Figure 26:
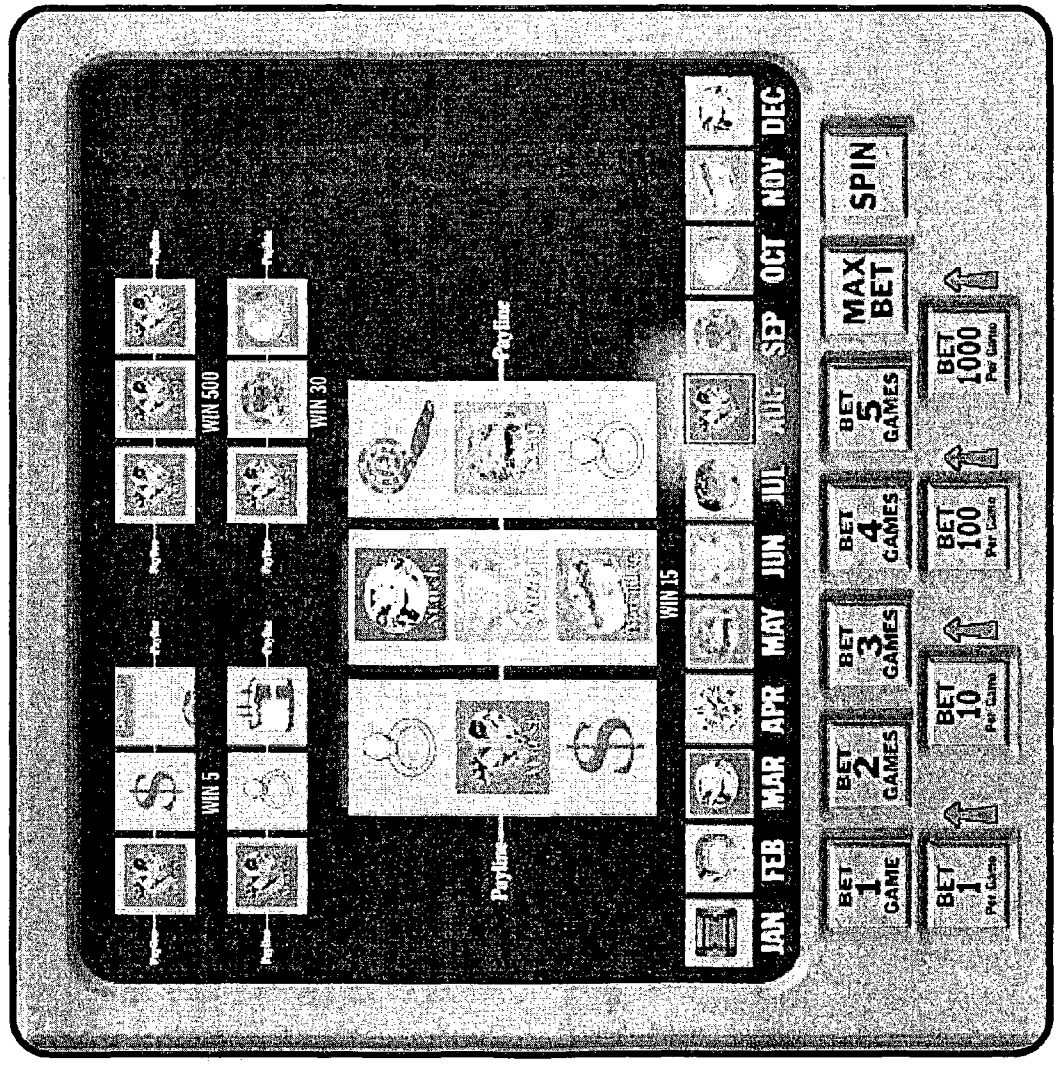
FIG. 26 shows all three reels of the main game and the four satellite games having stopped, with one bonus event occurring because of symbol events displayed on one of the satellite paylines.
Figure 27:
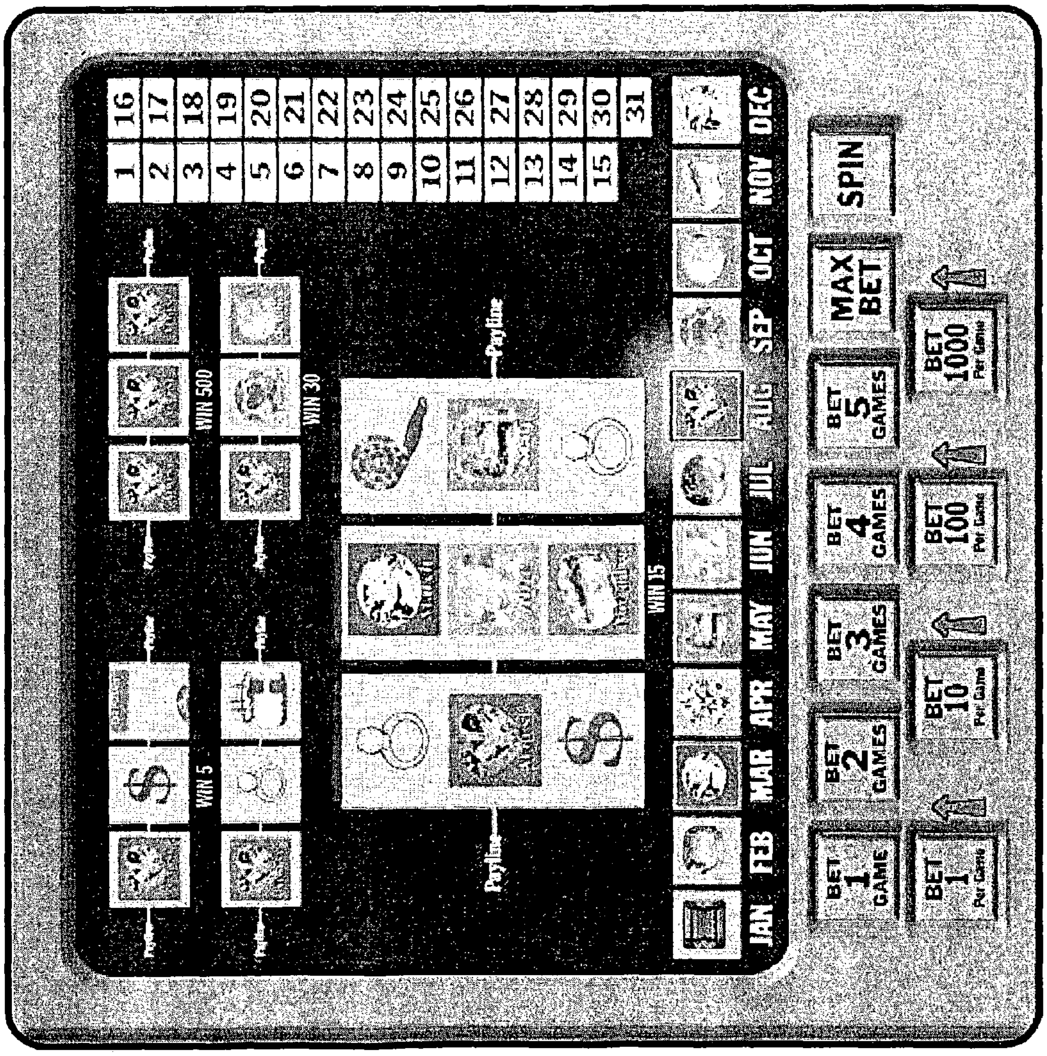
FIG. 27 shows the display of a touch screen or manually selectable display of dates (1-31) from which days of the month may be selected by a player.

FIG. 7 shows an alternative play format. On monitor screen 20, reels 24, 26 and 28 in the base game have been completely stopped, but only frames 78, 84, 90 and 96 have been stopped to display symbol 60 in the frames shown along paylines 42, 44, 46 and 48. The remaining frames and reels in paylines 42, 44, 46 and 48 are still virtually spinning. The remaining spinning reels will then be stooped in any pattern to reach a display result such as that shown in FIG. 6. Individual satellite games may be completed before others as in FIG. 8, or all satellite games may be concluded at the same time as shown in FIG. 9. Reels along paylines 42, 44, 46 and 48 may be stopped one-at-a-time or all at once. Game payout results may be shown as each game (base game and satellite game) is finally displayed, or the payout results may be held until all games on which wagers have been placed or all displayed games have stopped. An alternative methodology or format for play of the underlying game play according to the generic scope of the present invention is shown in FIGS. 14-30. These Figures show a 5-play variant of a game according to the invention, with the additional of an interactive bonus feature. FIG. 14 shows an introductory screen for play of a variant of the game of the invention referred to as the "Lucky Day!" game. FIG. 14 shows a sample pay table for the Lucky Day! game based on the symbols displayed on paylines. These are only exemplary payouts based on the appearance of symbols and do not limit the practice of the invention by minimum or maximum amounts shown. FIG. 15 shows a completed screen at the end of play of the Lucky Day! game. Operative instructions for the screen are shown. FIG. 16 shows initiation of play of the Lucky Day! game by manual engagement of a button indicating a month. FIG. 17 shows manual entry of a spin command after selection of a month as in FIG. 16. FIG. 18 shows the three reels of the base or main game spinning at the same time that the three reels of each of the four satellite games are spinning. FIG. 19 shows the first reel of the base or main game of the Lucky Day! game having stopped on the symbol representing August and the first reels on each of the four satellite games also showing the August symbol. The symbols in the first frame on the four satellite games need not stop at the same instant as the first frame in the main game stops, but may stop sequentially or together at a later time, or in any pattern, but the first symbol on the satellite games must match the first frame of the main game. FIG. 20 shows the second reel of the base or main game of the Lucky Day! game having stopped, while the second reels on each of the four satellite games remain spinning. Note how the August portion of the date remains highlighted during play of the game. FIG. 21 shows the main or base game reels with the first, second and third reels stopped, while only the first reel in each of the four satellite games has stopped. FIG. 22 shows the second reel of the first of the four satellite games having stopped, while the second and third reels of the second, third and fourth satellite games are still spinning. FIG. 23 shows the second and third reels of the first and second of the four satellite games having stopped, while the second and third reels of the third and fourth satellite games are still spinning. FIG. 24 shows the second and third reels of the first, second and third of the four satellite games having stopped, while the second reels of the fourth satellite game are still spinning. FIG. 25 shows all three reels of the main game and the four satellite games having stopped, with one bonus event occurring because of symbol events displayed on one of the satellite paylines. FIG. 26 shows the display of a touch screen or manually selectable display of dates (1-31) from which days of the month may be selected by a player. FIG. 27 shows the touch screen selection of a, specific date in the bonus event of the Lucky Day! game.

Figure 28:
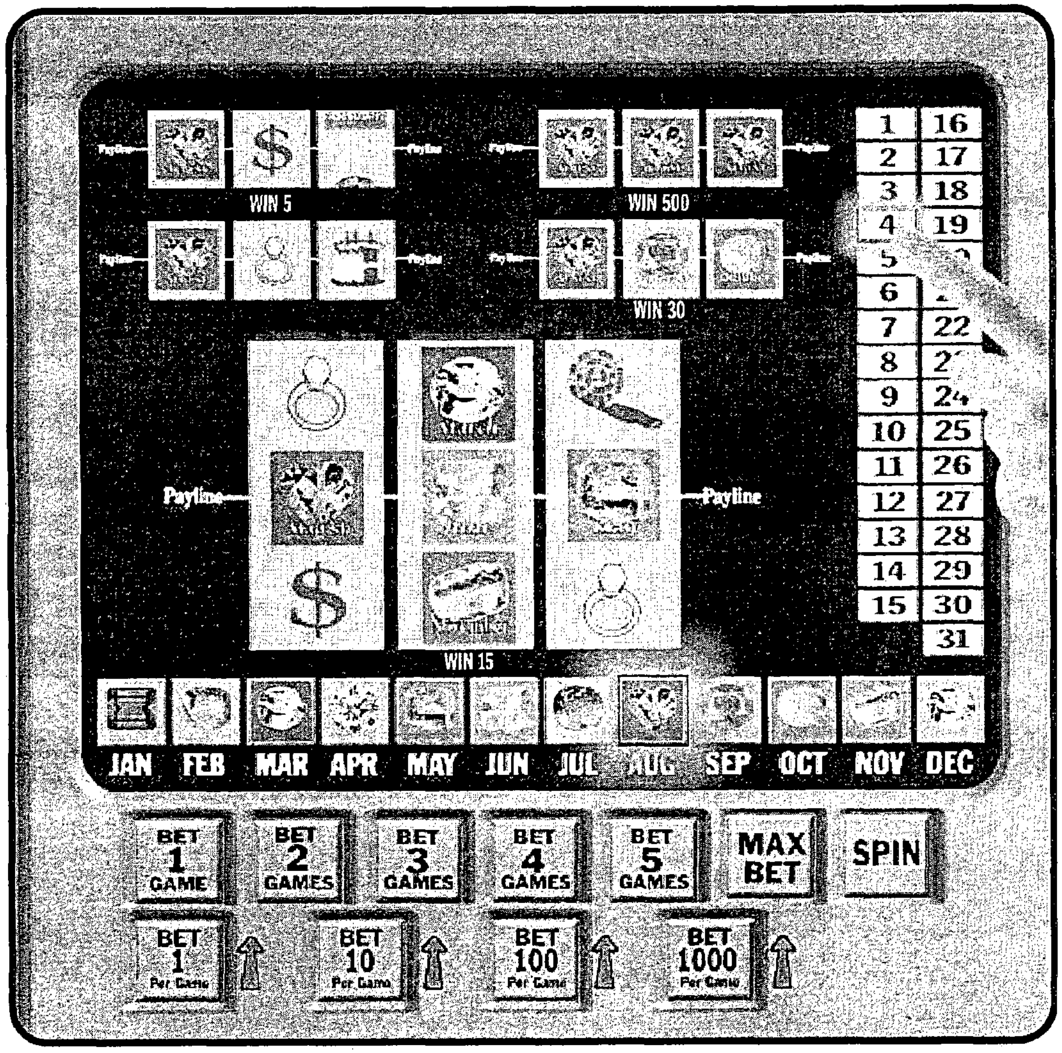
FIG. 28 shows the touch screen selection of a specific date in the bonus event of the Lucky Day! game.
Figure 29:
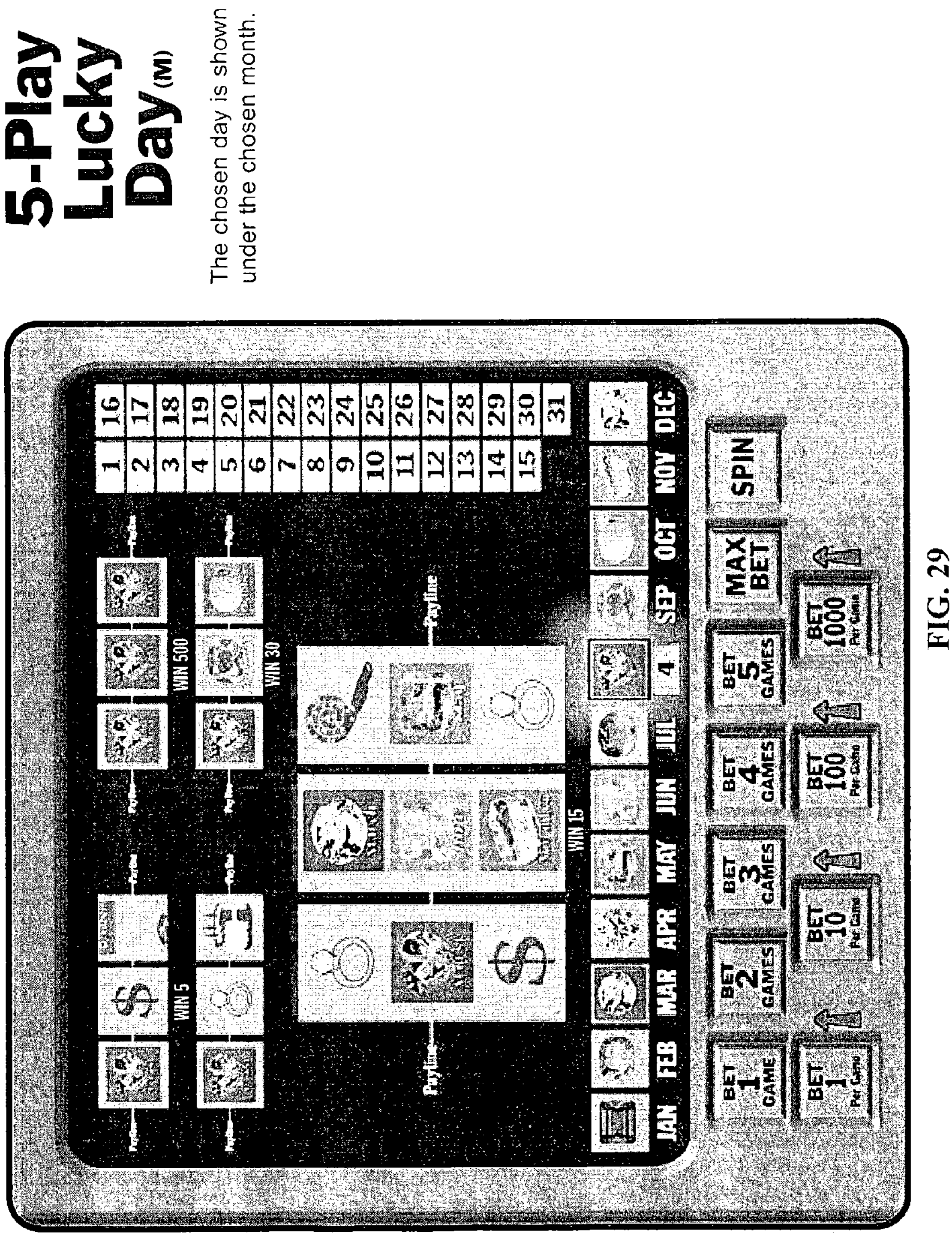
FIG. 29 shows the selected date being displayed on the screen, with the month replaced by the date.
Figure 30:
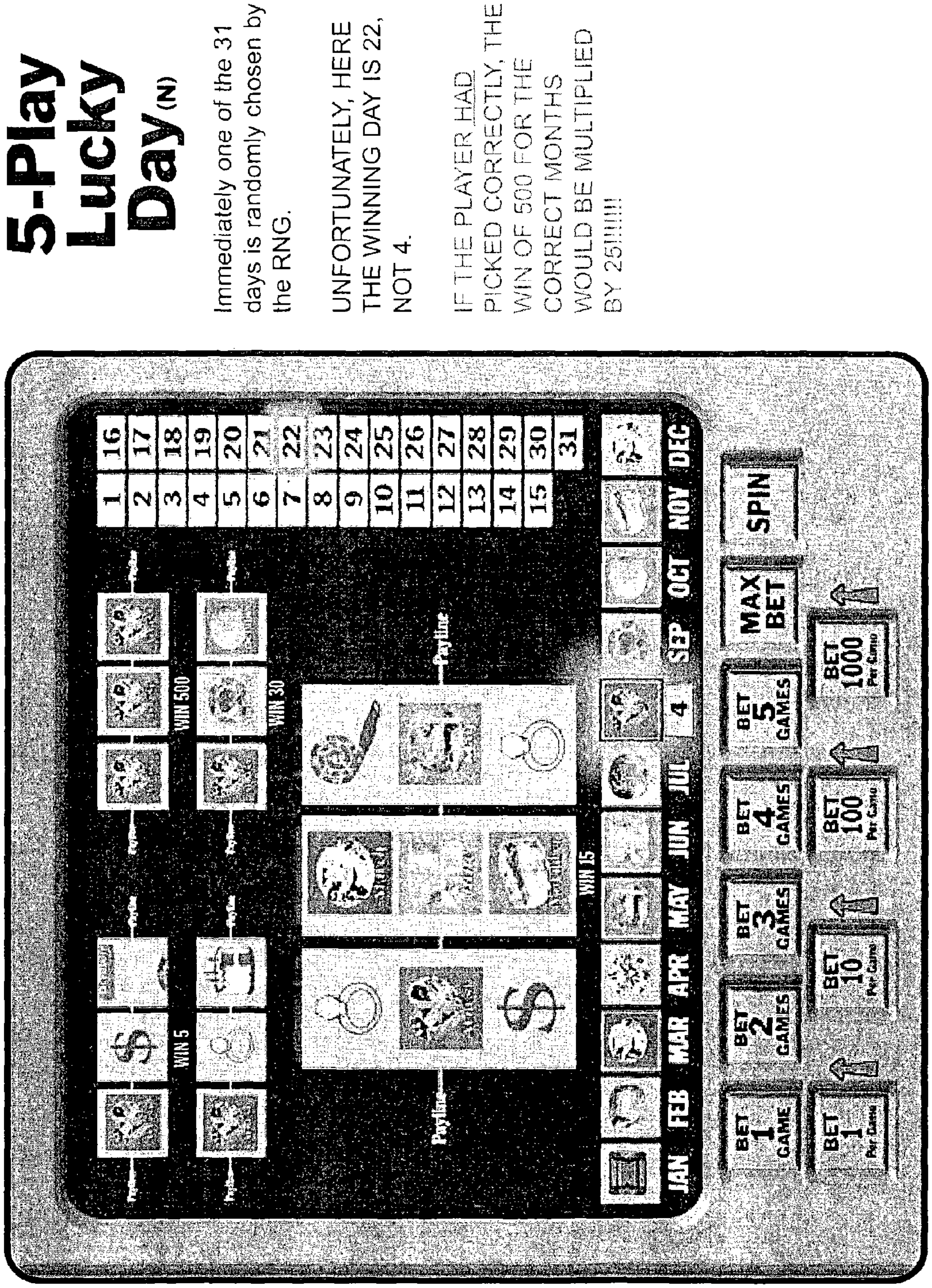
FIG. 30 shows the selection of the random pick specific day in the play of the bonus game.

FIG. 28 shows the selected date being displayed on the screen, with the month replaced by the date. FIG. 29 shows the selection of the random pick specific day in the play of the bonus game. As the random selection of the day does not match the player selection, there is not a necessary payment on the bonus. Additional bonus events may be provided by dividing the days into segments of adjacent days (and with considering dates of 1 and 31 to be adjacent), with smaller bonuses (e.g., 1X initial wager, 1X win on play of the base game, 2X wager, 2X winnings in the base game, up to 100's or 1000's of times the wager or the winnings for matching one of the segment dates. Smaller bonuses may be provided, for example, for the machine selecting a date adjacent the player selected date, related to a specific and particular number of days before or after the player selected date, holiday dates (e.g., July 4 in the U.S., July 14 in France, etc.), or any other event that can be related to the randomly selected date compared to the player selected date or any specific date (e.g., holiday). For example, if the randomly selected date on FIG. 30 had been August 11, that would be seven days later then the player selected date (the same day of the week), and a small bonus (compared to a matching date bonus) could be awarded.

In the play of the game, it is a matter of design to have only wagered games displayed, only wagered games shown with active screens showing spinning reels and symbol displays, or both actively wagered screens and inactively wagered screens shown spinning and with final symbols displayed.

As noted, these descriptions are illustrative and are not intended to provide ultimate limitations in the practice of the invention. Alternate constructions, designs and apparatus may be used by those skilled in the art within the scope of practice of the invention. Various equipment and software and procedures known in the art such as security, validation, game and software verification, ticket-n-ticket-out controls, credit card or playing card reading ability, coin acceptance, credit verification, currency validation, currency changing, player monitoring, central computer control and the like may be provided with the gaming apparatus playing the games of the invention.

The invention claimed is:

1. A method of playing a wagering game comprising:

a player placing a wager in a gaming machine, the gaming machine having more than one symbol display system comprising a first symbol display area and at least a second symbol display area;

the first symbol display area and the at least a second display area displaying a plurality of symbols that are used to determine winning events;

the first display area providing at least one first symbol;

automatically providing that at least one first symbol to the at least second display area;

independently and randomly completing symbol display for each of the first display area and the at least second display area; and determining if winning events are present in the first display area and the at least second display area.

2. The method of playing a wagering game according to claim 1 wherein the player has the option of placing wagers on the at least second display area or not placing a wager on the at least second display area.

3. The method of claim 1 wherein when a player selects a total amount to be wagered in a round of games, the wagers are distributed automatically among the first display area and the at least one second display area.

4. The method of claim 3 wherein when the total amount wagered is not evenly divisible by a total number of second display areas wagered upon, wagers are automatically distributed among display areas, with a maximum difference in wagers or different display area allowed.

5. The method of claim 4 wherein the maximum difference is one minimum wagering unit.

6. The method of claim 5 wherein the first display area is required to have a wager placed thereon that is no smaller then any wager placed on any other display area.

7. A video gaming apparatus comprising a housing, processor, and video display, the gaming apparatus having hardware and software enabling practice of the method of claim 1.

8. A video gaming apparatus comprising a housing, processor, and video display, the gaming apparatus having hardware and software enabling practice of the method of claim 2.

9. A video gaming apparatus comprising a housing, processor, and video display, the gaming apparatus having hardware and software enabling practice of the method of claim 3.

10. A video gaming apparatus comprising a housing, processor, and video display, the gaming apparatus having hardware and software enabling practice of the method at claim 4.

11. A video gaming apparatus comprising a housing, processor, and video display, the gaming apparatus having hardware and software enabling practice of the method of claim 5.

12. A video gaming apparatus comprising a housing, processor, and video display, the gaming apparatus having hardware and software enabling practice of the method of claim 6.

13. The method of claim 1 wherein a player selects a bonus event related to symbols or events that may occur in any symbol display area and the appearance of predetermined events in any of the symbol display areas cause a bonus event to occur in which the selected bonus event provides a bonus when the selected bonus event has a predetermined relationship to specific predetermined events.

14. The method of claim 1 wherein the selected bonus event comprises a generic category and the player or machine then makes a first selection of a species from within the generic category as an element of play in a bonus game.

15. The method of claim 14 wherein after first selection of a species by the player, the machine makes a random second selection from among species.

16. The method of claim 15 wherein predetermined relationships between the first selection and the second selection determine a bonus amount to be paid to the player.

17. The method of claim 16 wherein there are more then one bonus awards available depending upon different predetermined relationships.

18. The method of claim 1 wherein a player selects a symbol prior to play of an underlying game that establishes an element of bonus play in the event that a player is awarded a bonus play in the play of the underlying game.

19. The method of claim 18 wherein the bonus play includes random selection of species within a genus that is part of the symbol selected by the player.

20. A method of playing a wagering game comprising:

a player placing a wager in a gaming machine, the gaming machine having more than one symbol display system comprising a first symbol display area and at least a second symbol display area;

the first symbol display area and the at least a second display area displaying a plurality of symbols that are used to determine winning events;

the first display area providing at least one first symbol of the plurality of symbols;

always providing that at least one first symbol to the at least second display area as a portion of symbols to be displayed in the second display area;

independently and randomly completing symbol display for each of the first display area and the at least second display area, the completion of symbols in the second display area occurring after providing the at least one symbol to the at least second display area; and determining if a winning event is present in the first display area and determining if an independent winning event is present in the at least second display area.

* * * * *